US008060408B2

(12) United States Patent
Koether et al.

(10) Patent No.: US 8,060,408 B2
(45) Date of Patent: Nov. 15, 2011

(54) DIAGNOSTIC DATA INTERCHANGE

(75) Inventors: Bernard G Koether, Tequesta, FL (US); Mario G Ceste, Wallingford, CT (US)

(73) Assignee: Technology Licensing Corporation, Tequesta, FL (US)

( * ) Notice: Subject to any disclaimer, the term of this patent is extended or adjusted under 35 U.S.C. 154(b) by 1315 days.

(21) Appl. No.: 11/156,862

(22) Filed: Jun. 20, 2005

(65) Prior Publication Data

US 2005/0251450 A1 Nov. 10, 2005

Related U.S. Application Data

(63) Continuation of application No. 11/156,862, filed on Jun. 6, 2005, which is a continuation of application No. 09/946,461, filed on Sep. 4, 2001, now Pat. No. 7,877,291, which is a continuation-in-part of application No. 09/587,797, filed on Jun. 6, 2000, now abandoned, which is a continuation of application No. 09/083,671, filed on May 22, 1998, now abandoned, which is a continuation of application No. 08/643,207, filed on May 2, 1996, now Pat. No. 5,875,430.

(51) Int. Cl.
*G06Q 30/00* (2006.01)

(52) U.S. Cl. ............... 705/15; 705/1.1; 705/30; 705/34

(58) Field of Classification Search ............ 705/15, 705/1.1, 30, 34
See application file for complete search history.

(56) References Cited

U.S. PATENT DOCUMENTS

| | | |
|---|---|---|
| 4,120,452 A | 10/1978 | Kimura et al. |
| 4,547,851 A | 10/1985 | Kurland |
| 4,553,222 A | 11/1985 | Kurland et al. |
| 4,601,004 A | 7/1986 | Holt et al. |
| 4,636,949 A | 1/1987 | Longabaugh |
| 4,688,475 A | 8/1987 | Witt et al. |

(Continued)

FOREIGN PATENT DOCUMENTS

EP 0335698 A2 10/1989

(Continued)

OTHER PUBLICATIONS

Dialog reference file 148, No. 05758309, "Energize your market with Smart House", Professional Builder and Remodeler, V56 n1, p. 135(2), Jan. 1992.*

(Continued)

*Primary Examiner* — Raquel Alvarez
(74) *Attorney, Agent, or Firm* — Howard M. Gitten; Edwards, Angell, Palmer & Dodge LLP

(57) ABSTRACT

The present invention provides a bi-directional communication network which provides monitoring, data collection, and control of food service industry operations. The system includes a computer and control logic implemented by the computer which may be configured to perform various tasks. A communication network may be provided linking the computer with equipment and appliances having a microprocessor based controller capable of communicating with the system. In one embodiment, the system automatically verifies the performance of equipment-related manual tasks in food preparation. In another embodiment, the system schedules the maintenance of a plurality of kitchen appliances. In another embodiment, the system provides a hold timer for tracking the hold time of cooked food products and determines when the hold time elapses. In yet another embodiment, the system manages the inventory of cooked food products in a food preparation establishment.

34 Claims, 14 Drawing Sheets

U.S. PATENT DOCUMENTS

| | | | |
|---|---|---|---|
| 4,742,455 A | | 5/1988 | Schreyer |
| 4,812,625 A | | 3/1989 | Ceste, Sr. |
| 4,812,963 A | * | 3/1989 | Albrecht et al. ............ 700/2 |
| 4,864,498 A | | 9/1989 | Pasquini et al. |
| 4,919,950 A | | 4/1990 | Mak |
| 4,920,948 A | | 5/1990 | Koether et al. |
| 4,922,435 A | | 5/1990 | Cahlander et al. |
| 5,043,860 A | | 8/1991 | Koether et al. |
| 5,060,559 A | | 10/1991 | Winter |
| 5,128,862 A | | 7/1992 | Mueller |
| 5,132,914 A | | 7/1992 | Cahlander et al. |
| 5,171,974 A | | 12/1992 | Koether et al. |
| 5,172,328 A | | 12/1992 | Cahlander et al. |
| 5,331,575 A | | 7/1994 | Koether et al. |
| 5,539,671 A | | 7/1996 | Albrecht et al. |
| 5,544,567 A | | 8/1996 | Davis et al. |
| 5,711,606 A | | 1/1998 | Koether |
| 5,723,846 A | | 3/1998 | Koether et al. |
| 5,774,528 A | * | 6/1998 | Bogner et al. ......... 379/106.01 |
| 5,786,568 A | | 7/1998 | McKinney |
| 5,839,115 A | | 11/1998 | Coleman |
| 5,875,430 A | | 2/1999 | Koether |
| 5,900,801 A | | 5/1999 | Heagle et al. |
| 5,924,077 A | | 7/1999 | Beach et al. |
| 5,939,974 A | | 8/1999 | Heagle et al. |
| 6,011,243 A | | 1/2000 | Arnold et al. |
| 6,080,972 A | | 6/2000 | May |
| 6,088,681 A | | 7/2000 | Coleman et al. |
| 6,121,593 A | | 9/2000 | Mansbery et al. |
| 6,133,555 A | | 10/2000 | Brenn |
| 6,137,095 A | | 10/2000 | Kashimoto et al. |
| 6,980,079 B1 | | 12/2005 | Shintani et al. |

FOREIGN PATENT DOCUMENTS

| | | |
|---|---|---|
| JP | 2005-123946 | 5/1993 |
| JP | 2006-295301 | 10/1994 |
| KR | 1998-0010281 | 4/1998 |
| KR | 2001-0072901 | 7/2001 |
| WO | WO-99/10794 A2 | 3/1999 |

OTHER PUBLICATIONS

U.S. Appl. No. 09/587,797, Koether.
U.S. Appl. No. 09/082,671, Koether.
Office Action from parent U.S. Appl. No. 09/083,671, Paper No. 22, dated Jan. 13, 2003.
Israeli Office Action dated Jan. 21, 2009, P.K. 25; Document No. 01525583\49-01.
Japanese Patent Office Action dated Jan. 25, 2011 (English Translation) of Japanese Patent Application No. 2008-296971.

* cited by examiner

DIAGNOSTIC DATA INTERCHANGE

CROSS-REFERENCE TO RELATED APPLICATIONS

This is a continuation of co-pending U.S. patent application Ser. No. 11/156,862 filed Jun. 6, 2005, which is a continuation of U.S. patent application Ser. No. 09/946,461 filed Sep. 4, 2001 now U.S. Pat. No. 7,877,291; entitled "Diagnostic Data Interchange"; which is a continuation-in-part of U.S. patent application Ser. No. 09/587,797 filed Jun. 6, 2000, entitled "Smart Commercial kitchen network" (now abandoned), which was a continuation of U.S. patent application Ser. No. 09/083,671 filed May 22, 1998, entitled "Smart Commercial Kitchen Network" (now abandoned), which was a continuation of U.S. patent application Ser. No. 08/643,207 filed May 2, 1996, now U.S. Pat. No. 5,875,430 entitled "Smart Commercial Kitchen Network", which are incorporated herein by reference. Also, the present application is related to commonly assigned U.S. Pat. No. 4,812,963 entitled "Plural Cooking computer communication system," and U.S. Pat. No. 5,723,846 entitled "Multi-probe Intelligent Diagnostic System For Food-processing Apparatus," which are incorporated herein by reference.

TECHNICAL FIELD

The present invention relates to a communication network and, more particularly, to a communication network, such as a cooking computer communication system, for monitoring and controlling the activities of commercial kitchen or restaurant appliances, and for providing bi-directional communication between such appliances and a control center. Such kitchen or restaurant appliances, for example, includes deep vat flyers and various types of ovens, and cooling systems, such as refrigerators and HVAC systems, as well as other related food processing systems found in today's restaurants and fast food chains.

BACKGROUND OF THE INVENTION

In recent years, as cooking and restaurant appliances in large hotels or institutional kitchens have become more complex, there has been an increased need for the utilization of computers for diagnosing malfunctions. Today, cooking appliances are maintained and serviced, however, by a food service industry—that with exceptions—is too poorly equipped and untrained to do so. The domestic food service industry is composed of some three hundred independent service agencies, ranging in size from one up to hundreds of employees. Most, however, consist of just a few employees which are unfortunately burdened with the responsibility for preparing invoices, repairs, inventories, warranties, credits, returns, and the like. For example, these service agencies not only have to generate invoices, but also have to collect payment, which for obvious reasons is time consuming. With such other duties, service agencies have little time to keep up with the technology of today's complex kitchen or cooking appliances. With the existing food service industry so fragmented and ill-suited to handle administrative tasks as well as appliance repairs, it is estimated that their efficiency may be as low as 20%.

Accordingly, there is a need in the art to provide a cost-effective system which enhances the work force utilization of today's food service industry, allowing the proper work allocation of administrative and repair skills among those best suited to perform the tasks.

The food service industry is also faced with the problem of a difficult labor market. There is stiff competition for good employees and not enough workers to fill open positions. Supervision is difficult as well, especially for an owner/operator of multiple commercial units spread over many miles. Workers may be inadequately trained, careless or may take shortcuts in completing their tasks properly. Any of these problems can adversely affect food quality, level of service to the consumer, and compliance with various health and safety standards (for example, the Hazard Analysis Critical Control Point (HACCP) regulations created by the Food Safety and Inspection Service of the United States Department of Agriculture to minimize bacteria-related illnesses which can result from improper food handling, preparation, and holding). These problems plague even computerized kitchen systems, because those systems can neither independently verify that the ascribed tasks have been properly completed, nor identify employees who are cheating the system. Moreover, to be competitive in today's global economy, the food service industry must gain tighter control over every process in the kitchen to combat escalating labor costs, achieve more accurate product forecasting, and realize faster and more efficient food preparation to better manage both facilities and human resources.

Appliance Status/Monitoring

There is a need in today's food service industry for a system that is capable of generating computerized task lists on a real time basis instructing employees to perform needed tasks, and then guiding the employees through the required tasks. These task lists could be transmitted and displayed on CRT's in the area of the restaurant where the task will be performed by the employee for easy reference. The task lists may also be accompanied by audible instructions in addition to, or instead of by visual means alone. Such task lists could, for example, provide timely communication between the point of sale (POS) and kitchen for placing orders. Computerized task lists could also provide important training for employees (especially new trainees), which due to high employee turnover rates in the food service industry, has become especially problematic for restaurant managers who have precious little time to spare for training in the first instance. Accordingly, computer generated lists could step employees through the cooking process for preparing various food items, various maintenance and cleaning procedures related to cooking appliances and other equipment, and any other required general duties.

Known systems use labor management tools to generate and printout a static list of tasks to be done, for example, at the beginning of each day. However, such lists do not have any real-time feedback and thus are not dynamic, and do not adapt to actual and ever changing operating conditions and requirements in a restaurant. Accordingly, there is also need for a system which can update and modify task list based on sensed or measured operating conditions.

Current fast-food systems typically use in-store CRTs to display tasks. When a task is complete, the employee typically hits a "bump bar" below the screen to notify the system that the task is done. The system then updates the CRT to indicate that task is done. But this assumes that there is no "cheating" (i.e., hitting the bump bar without properly completing the task) by the employee. This situation has been problematic for supervisors who in the fast-paced food service industry cannot possibly watch all their employees constantly to ensure that tasks are actually being properly performed. Furthermore, cheating by employees can have a detrimental financial impact on the fast-food and other restaurants. For example, pulling food prepared in a deep vat fryer out before it is done can adversely affect food quality (e.g., taste, texture, appearance, etc.) and shelf life. Likewise, for example, bakers who pull products out of ovens before they are finished baking adversely affect food quality. Improperly prepared food causes customer dissatisfaction and loss of repeat business which translates into financial losses for food service providers. Another example where cheating adversely affects the food service industry is in the area of maintenance Employees who are lazy or busy may often seek shortcuts by simply skipping maintenance tasks, or performing them inadequately, but still hit the bump bar. Known systems cannot detect and provide a sufficient check on this type of cheating. Accordingly, there is a need for a system which can provide automatic verification that a required task has been properly completed by sensing various operating parameters, rather than relying only on the honesty employees alone.

Virtual Hold Timer

The amount of time a food item can be held and served after it has been cooked is governed by both franchise standards and government regulations. For example, the Hazard Analysis Critical Control Point (HACCP) standards established by the Food Safety and Inspection Service (FSIS) of the United States Department of Agriculture (USDA) dictates the amount of time food can be held at various temperatures after it has been cooked before it must be discarded. These standards are intended to prevent illnesses caused by ingesting food products contaminated with microbial pathogens which may be passed on to consumers by improper food handling practices. Therefore, accurate measurement and tracking of food "hold times" is of critical importance to the food preparation industry. Once this "hold time" expires, the food must be thrown out.

Current systems often use small plastic tags, for example, saying "00", "15", "30", "45", etc. to represent minutes past the hour when the food expires—the tag travels with the food. It is also possible to include a small mechanical or electronic timer that travels with the food. Another known system uses electric or mechanical timers at each successive location; however, it is complicated to set each successive timer based on the amount of time left on the timer at the previous location. These known systems have not worked well, and much food is often sold beyond its proper hold time, thereby subjecting food service operators to liability for violating HACCP standards and potentially exposing consumers to food-borne related illnesses.

Accordingly, there is a need for a system that can establish an automatic "virtual" hold timer associated with each batch of food that is prepared. Such a system could track the movement of each batch of food through the restaurant or kitchen, and figuratively "travel" with the food from the cooking appliance to various holding areas and the point of sale (POS). Such a system could also provide a single, continuous hold timer for each batch of food, thereby eliminating the need for kitchen or restaurant employees to set new times manually taking into account elapsed hold time from a previous cooking or hold station. This minimizes the risk associated with food handlers having to physically handle timers and either misplacing them or making errors in setting successive timers. Moreover, such a system could assist in controlling inventory of cooked food items by sensing that a particular batch of food being held is about to expire and then sending a signal instructing food preparers that another batch of the same product. Such a system could further be linked to the POS system and historical sales data maintained by the system to determine how much of a particular food product should be cooked to meet the anticipated demand and replace the food whose hold time is about to expire.

Shortening Management/Fryer Maintenance Management

The proper maintenance of deep-fat fryers is also of great concern to the operator of a commercial or institutional cooking establishment. Such fryers typically use food-grade oil or shortening as the cooking medium. However, the cooking medium degrades with each cooking cycle. In order to ensure consistent food quality, periodic filtering and/or changing of the cooking medium is required. Fryer controllers are often hardwired to demand cleaning at a fixed time each day; thus making it impossible to adapt fryer maintenance to actual operating data (such as sales conditions, number of cooking cycles, etc). Other prior art systems such as that described in U.S. Pat. No. 5,331,575 to Koether et al. are directed to a stand-alone "smart fryer" in which a cooking computer is physically connected to an individual flyers. Such prior art systems offer some improvement over the fixed-time fryer controllers in that they attempt to ensure that changing or filtering of the cooking medium is conducted timely and properly, based on tracking actual flyer usage and other relevant parameters such as cooking temperatures. However, an individual fryer cooking computer only determines when cooking medium maintenance is required for the particular flyer with which it is physically associated, without regard for any other fryers. This is problematic for restaurant management because it is not desirable to have too many fryers unavailable due to maintenance when the restaurant is busy and demand for food is highest. Ideally, fryer maintenance should coincide with off-peak demand periods, or at the very least, multiple fryers should not be unavailable for service at the same time. Accordingly, there is a need for a networked control system that could monitor and control maintenance of all fryers at a given restaurant location. Furthermore, there is a need for a networked control system that can balance individual fryer usage and time the maintenance of all fryers at a given restaurant location to ensure that a maximum number of flyers are available for service during periods of peak food demand.

SUMMARY OF THE INVENTION

The present invention provides a bi-directional communication network which provides real-time computer-aided diagnostics, asset history, accounting records, maintenance records and energy management. Advantageously, such a network integrates the various work aspects of today's food service industry to insure the proper work allocation of administrative and repair tasks.

The system includes a control center linked to a point of sale (POS) or automated teller machine (ATM) system, a plurality of kitchen base stations, and a plurality of kitchen or restaurant appliances located within a site or cell(s). Maintenance and repair, once initialized, are monitored, for example, through the control center having a database with the necessary software diagnostics, accounting records, inventory records, and maintenance records for the particular appliance under service so as to integrate the various aspects of accounting, billing, repair and energy management.

In a preferred embodiment, each cell is allocated at least one communication channel, preferably wireless, to effect bidirectional communication with the base stations, which in turns are interconnected to the control center over high speed data links. In particular, the system monitors and tracks the maintenance and repair of kitchen appliances by means of information transmitted to and received from those appliances over the data network. Such information may include cooking parameters, billing information, appliance identification, diagnostic information, and maintenance instructions, among others. Direct billing is facilitated by transferring financial information among POS or ATM systems operated by various merchants and clearing house network centers.

Each kitchen base station may interrogate the appliance or the appliance may request to transmit diagnostic information relating to the operating conditions thereof, which diagnostic information may be immediately communicated to the control center. The control center may take action as appropriate, including, among others, downloading updated, operating and/or diagnostic software to the appliance, dispatching a service vehicle, or updating accounting and inventory information. Most of the functions are automatically controlled by the control center, but may be also performed manually by a control center operator. Alternatively, some of these functions may be distributed to the base stations, such, as in a distributed architecture network.

In the preferred embodiment, on site repair is enhanced through the use of a portable hand held terminal linked to the appliance through, for example, a wireless RS-232 interface, such as by infrared communication. The hand held terminal interrogates the appliance to diagnose abnormal operating conditions. Upon effecting repair, the control center preferably prepares and transmits an appropriate invoice and effects billing through the POS or ATM system. During repairs, should the hand held terminal require updated diagnostic software for the particular appliance under service, such a request is transmitted to the control center. The appropriate software is then transmitted to the terminal through the communication data network. In this manner, as new diagnostic tools become available for specific kitchen or restaurant appliances, they are readily accessible for use by the food service industry.

Similarly, the database contains maintenance instructions for each type of kitchen or restaurant appliance. If the service personnel is unfamiliar with the appliance, a request may be initialized for the control center to download the necessary repair and maintenance instructions for the appliance under service.

Importantly, the control center includes a database containing customer information, accounting history, appliance data, such as previous repairs and faults, updated diagnostic software and billing data. Advantageously, this allows service personnel as well as control center operators to update credits, warranties, or returns for a particular subscriber in real time. Also, service personnel may request the control center to generate and transmit various accounting, billing or repair records for a specific subscriber or appliance. Such capabilities enhance quality control as well as minimize the amount of work performed by service personnel on administrative tasks.

The control center may, if desired, control in real-time the normal operation for some or all of the kitchen or restaurant appliances. For example, to effect a change in a recipe for a particular food product, new cooking parameters may be communicated to the controllers of each desired kitchen or restaurant appliance. In this manner, retail food service chains may readily update the cooking profiles of their food products on a global basis.

In another aspect of the invention, the control center may control when the kitchen or restaurant appliances are turned on and off. In this manner, a minimum peak power can be achieved by limiting the number of appliances turned on at any instance in time. Moreover, the appliances can be prioritized so that desired appliances can be serviced first, depending on the type of appliance and its relative importance to the location.

Appliance Status/Monitoring

In accordance with one embodiment, the system may be used to automatically verify the performance of equipment-related manual tasks for equipment used in food preparation. The system includes at least one piece of equipment having a microprocessor capable of communicating with the system. At least one sensor capable of sensing a parameter related to the performance of at least one equipment-related manual task is provided. In one embodiment, the parameter provides an indication of whether the at least one equipment-related manual task was completed. In another embodiment, the parameter is indicative of whether the at least one equipment-related manual task was properly performed.

The system further includes a control computer which implements control logic that is operative to automatically monitor the performance of the at least one equipment-related manual task. A communication network that is provided allows communication between the computer and one or both of the at least one piece of equipment and sensor. The control computer may be resident in a kitchen base station or in a control center. The equipment may be a kitchen appliance which in one embodiment may be a fryer.

In one embodiment, the communication network effectuates communications over the Internet. In another embodiment, the communication network effectuates communications between the computer and the at least one piece of equipment by wireless data transmission. The wireless data transmission may be performed over the Internet.

In another embodiment, the computer generates at least one message pertaining to the at least one equipment-related manual task. The at least one message may be displayed on a visual display monitor where, for example, it can be observed by personnel in a food service establishment. The message may also be simultaneously delivered by the system to a location remote from the food service establishment (e.g., a control center) via the communication network to inform the food establishment operator or management. The message may be accessible to the operator or management over the Internet through a Web interface.

The system may further comprise a database containing stored historical information related to the performance of the at least one equipment-related manual task. In one embodiment, the stored historical information comprised information related to one or more of the set of: the type of the at least one equipment-related manual task; when the task was performed; and the identity of the person performing the task.

A method for automatically monitoring the performance of equipment-related manual tasks is also provided which may comprise the steps of:

providing at least one piece of equipment used in food preparation, said piece of equipment having a microprocessor-based controller;

providing at least one sensor capable of sensing a parameter related to the performance of at least one equipment-related manual task;

providing a control computer implementing control logic operative to automatically monitor the performance of the at least one equipment-related manual task;

providing a communication network allowing communication between the control computer and one or both of the at least one piece of equipment and the sensor;

monitoring the at least one piece of equipment;

performing the at least one manual task involving the at least one piece of equipment; and sensing the performance of the at least one equipment-related manual task.

In one embodiment, the method further comprises the communication network effectuating communications at least in part over the Internet. In another embodiment, the method further comprises effectuating the communication between the control computer and one or both of the at least one piece of equipment and the sensor being at least in part by wireless data transmission. The method may further comprise performing the wireless data transmission at least in part over the Internet.

The method may further comprise the step of generating at least one message pertaining to the at least one equipment-related manual task. In one embodiment, the method further comprises the step of displaying the at least one message on a visual display monitor.

Shortening Management System

In accordance with another embodiment, the system may be used to schedule the maintenance for a plurality of kitchen appliances in a food preparation establishment. In one embodiment, the appliances may be fryers. The system comprises a plurality of kitchen appliances, a computer capable of communicating with the plurality of kitchen appliances, and a communication network linking the computer with the plurality of kitchen appliances. The kitchen appliances have microprocessor based controllers that are capable of communicating with the system. Control logic is provided which is implemented by the computer and is operative to schedule the maintenance of the plurality of kitchen appliances. The control logic may be resident in a kitchen base station or a control center.

In one embodiment, the control logic may be operative to determine the daily consumer demand for at least one cooked food product. The system may further comprise the control logic being operative to maximize the number of kitchen appliances available for service at selective time periods during the day, which in one embodiment are peak demand periods for food products. The control logic may also be operative to balance the utilization of the plurality of kitchen appliances.

In another embodiment, the system further comprises the maintenance being scheduled so that a maximum number of kitchen appliances available for service at any given time period during the day to coincide with at least one peak demand time period for at least one food product.

In one embodiment, the communication network effectuates communications over the Internet. In another embodiment, the communication network effectuates communications between the computer and the at least one piece of equipment by wireless data transmission. The wireless data transmission may be performed over the Internet.

A method for scheduling maintenance of a plurality of kitchen appliances in a food preparation establishment is also provided which comprises the steps of:
  providing a plurality of kitchen appliances; providing a computer capable of communicating with the plurality of kitchen appliances;
  providing a communication network linking the computer with the plurality of kitchen appliances;
  providing control logic implemented by the computer;
  monitoring actual operating data of the plurality of kitchen appliances;
  predicting food product demand; and
  scheduling the maintenance of the plurality of kitchen appliances.

In one embodiment, the method involves scheduling maintenance for fryers, which in another embodiment is changing or filtering of cooking medium used in the fryers. The method may further comprise scheduling the maintenance of the plurality of kitchen appliances to maximize the number of appliances available at selective time periods during the day. In one aspect of the invention, the selective time periods of the method coincide with at least one peak demand time for at least one food product.

Virtual Hold Timer

In accordance with one embodiment, a system for tracking the hold time of cooked food products is provided comprising: at least one cooked food product having a predetermined hold time; a plurality of food holding areas to hold the at least one cooked food product; a control computer; and control logic implemented by the computer. The control logic is operative to determine when the hold time for the at least one cooked food product elapses.

In one embodiment of the invention, the control logic is also operative to determine if the at least one cooked food product has been moved from a first food holding area to a second food holding area. The control logic may further be operative to record the movement of the at least one cooked food product to the at least second food holding area.

The control logic may also be operative to generate an expiration signal when the hold time for the at least one cooked food product has elapsed. An audiovisual indicator which, responsive to the expiration signal, may also be provided which indicates that the hold time has elapsed. An audiovisual indicator as used herein is defined to mean either an audio warning or a visual message display.

In accordance with one embodiment, the control logic of the system may be operative to assign a batch identification number to at least one cooked product. The system may further comprise data entry means to permitting a batch identification number to be manually input into the system to identify in which food holding area the food has been placed. In one embodiment, the batch identification number is input in the system at least in part by wireless data transmission. The data entry means may be a keypad associated with a food holding area.

The system may further comprise a sensor to measure some parameter related to at least one cooked food product, the sensor providing, to the control computer, a signal relating to the parameter. In one embodiment, the parameter relates to the presence or absence of the at least one food product in a specific holding area. In another embodiment, the parameter relates to the temperature of the at least one cooked food product.

In accordance with another embodiment, the system may be used to manage the inventory of cooked food products in a food preparation establishment. This system comprises: at least one cooked food product having a predetermined hold time; a plurality of food holding areas to hold the at least one cooked food product; a control computer; and control logic implemented by the computer. The control logic is operative to determine when the hold time for the at least one food product will elapse in the future and to provide advance notification of when the hold time will elapse. The system may further comprise advance notification times corresponding to different types of the at least one cooked food product being stored in a database accessible to the control logic.

The control logic may also be configured to generate an advance notification message signal indicative of when the hold time will elapse in the future. In response to this signal in one embodiment, an audiovisual indicator provides an advance indication of when the hold time will elapse in the future. The system may further comprise an audiovisual indicator to provide an indication to cook more of the at least one food product before the hold time elapses for the food product. In one embodiment, the system may further comprise the control logic being operative to determine if more of the at least one cooked food product whose hold time will elapse in the future is available or being cooked in another location in the food preparation establishment.

A method for tracking the hold time of cooked food products is also provided comprising the steps of:
  providing at least one cooked food product having a predetermined hold time;
  providing a plurality of food holding areas for holding the at least one cooked food product;
  providing a control computer;
  providing control logic implemented by the computer, the control logic being operative to determine when the hold time for the at least one cooked food product elapses; and
  determining when the hold time for the at least one cooked food product elapses.

The method may further comprise providing a data entry means to manually input a batch identification number of the at least one cooked food product into the control computer. In one embodiment, the method further includes the step of determining if the at least one cooked food product has been moved from a first food holding area to at least a second food holding area. The method may further include displaying a message that the hold time has expired for the at least one cooked food product. In another embodiment, the method comprises assigning a batch identification number to the at least one cooked food product.

A method is also provided for managing the inventory of cooked food products in a food preparation establishment comprising the steps of:
  providing at least one cooked food product having a predetermined hold time;
  providing a plurality of food holding areas for holding the at least one cooked food product;
  providing a control computer;
  providing control logic implemented by the control computer, the control logic being operative to determine when the hold time for the at least one food product will elapse in the future and to provide advance notification of when the hold time will elapse.
  determining when the hold time for the at least one food product will elapse in the future; and
  providing advance notification of when the hold time for the at least one food product will elapse in the future.

In one embodiment, the method may further comprise notifying food preparation establishment personnel to cook more of the at least one cooked food product before the hold time elapses for the at least one cooked food product. The method may also comprise determining if more of the at least one cooked food product whose hold time will elapse in the future is available or being cooked in another location in the food preparation establishment.

BRIEF DESCRIPTION OF THE DRAWINGS

The features and advantages of the present invention will become more readily apparent from the following detailed description of the invention in which like elements are labeled similarly and in which.

DETAILED DESCRIPTION

The inventive Smart Commercial Kitchen (SCK) network has the ability, among other things, in real-time to monitor and control the maintenance, repair and energy management of kitchen or restaurant appliances located over a wide geographical area. Maintenance and repair, once initialized, are monitored through a control center which contains the necessary software diagnostics, accounting records, inventory records, and maintenance records for the particular appliance under service. The capability to integrate these various accounting and repair services affords a highly efficient means for providing timely service to system subscribers. The SCK network may be customized to the particular needs of the subscribers, and due to the preferred use of wireless communication, such as cellular radio communication, may be installed and used virtually anywhere in the world.

It is contemplated that the present SCK network may be realized, in part, by wireless communication. It is to be understood, however, that the network described below is for the purpose of illustration only and not for the purpose of limitation. Other suitable communication, whether optical or wired, may be used with the present invention.

Also, in the embodiment below, integrated repair and accounting services are provided and coordinated preferably through a centralized control center. It should, however, be clearly understood that some of these services may be distributed or off loaded to base stations which may be programmed to effect these latter services. The choice is dependent on whether the network is structured as a highly centralized or distributed architecture.

Figure 1:
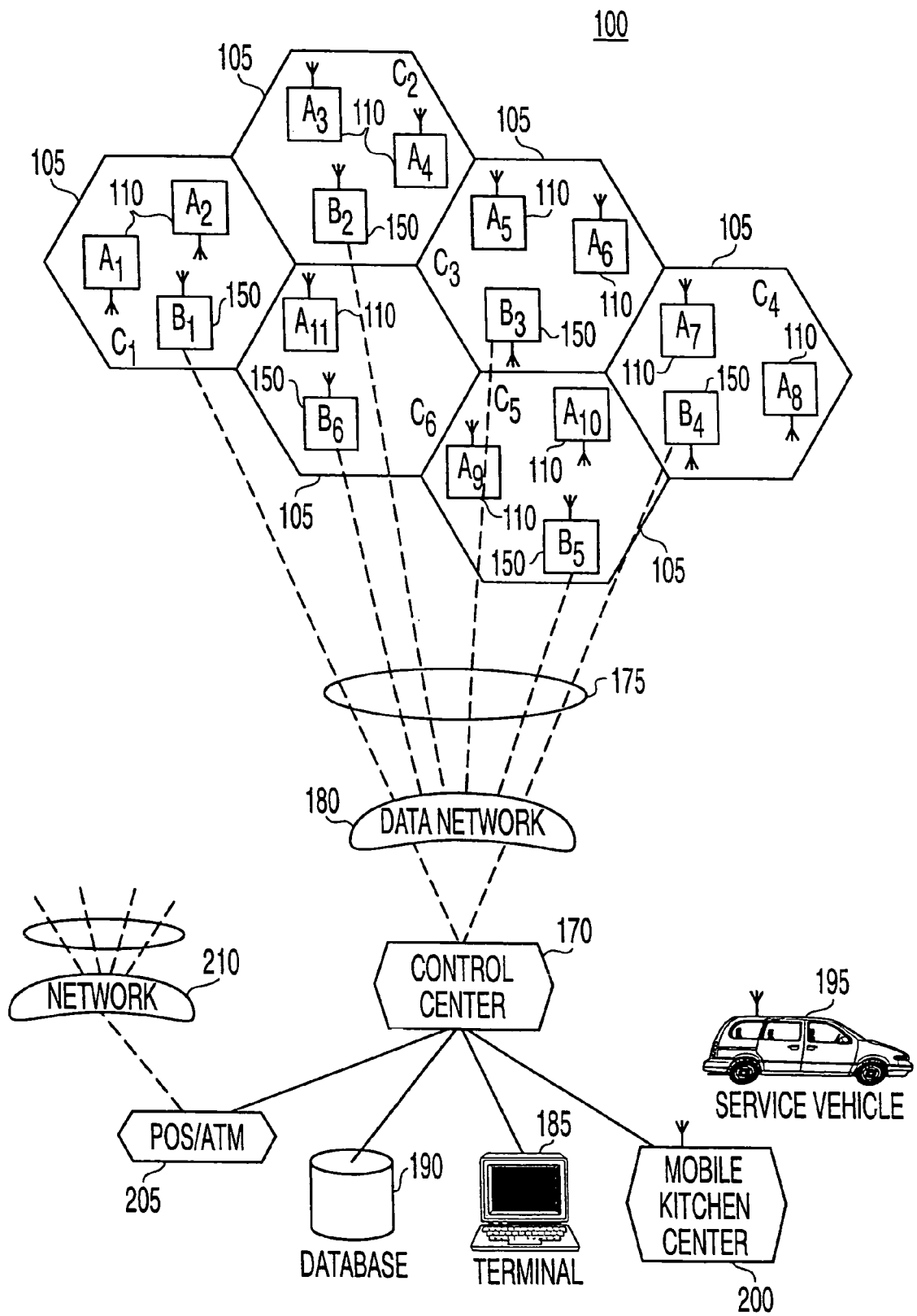
FIG. 1 is a pictorial representation of the present smart commercial kitchen network including a control center, a plurality of kitchen base stations, and a plurality of kitchen or restaurant appliances.

Referring to FIG. 1, there is shown—in schematic block diagram—a communication system 100 in accordance with the principles of the invention. In FIG. 1, an arbitrary geographic area may be divided into a plurality of radio coverage areas or cells 105 ($C_1$-$C_6$). It should be clearly understood that these cells may be located within the same or different buildings. While the system in FIG. 1 is shown to include only six (6) cells, it should be clearly understood that the number of cells may be much larger.

Figure 2:
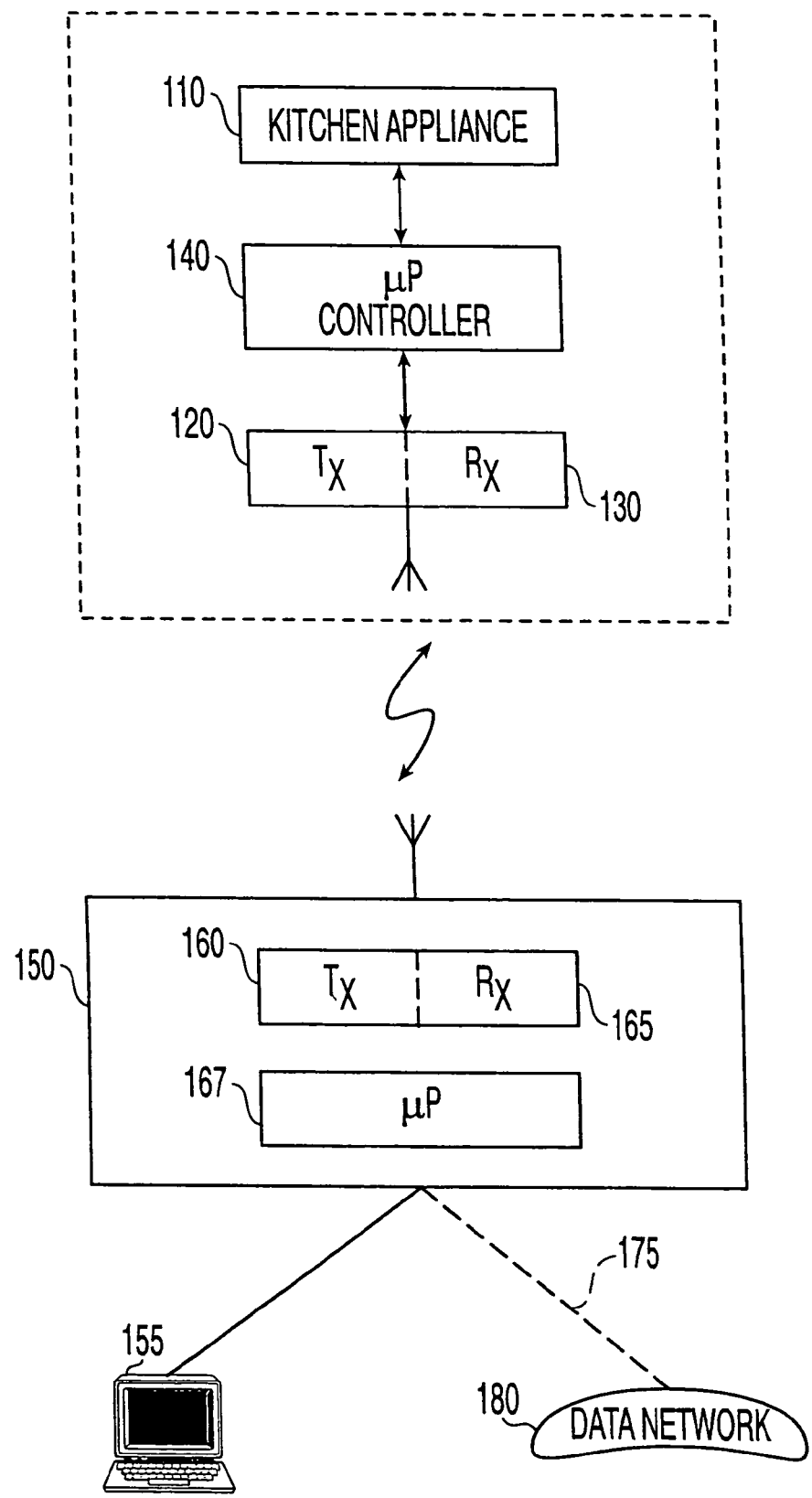
FIG. 2 is a more detailed block diagram of the appliances and the kitchen base stations of FIG. 1.

Associated with and located within each of cells 105 ($C_1$-$C_6$) is one or more kitchen or restaurant appliances 110 ($A_1$-$A_{11}$) under subscription to the services of the system. Each kitchen appliance 110 ($A_1$-$A_{11}$) is preferably provided with a RF transmitter 120, RF receiver 130 and microprocessor based controller 140, as illustrated in FIG. 2. Alternatively, each kitchen appliance may effect communications through wire data links. Restaurants, bakeries or hotels, for example, can have anywhere from one to forty (40) kitchen appliances at a single site or cell. Such kitchen or restaurant appliances include, for example, deep fryers, refractory ovens, baking ovens, combination ovens, infrared ovens, rotisseries, refrigerators, I-WAC systems, and the like.

Microprocessor based controllers have been developed, for example, by Food Automation—Service Techniques, Inc. (FAST.)® of Connecticut in recent years to assist in the preparation of properly cooked foods. These controllers, sold under the trade name FASTRON®, among other things, regulate the temperature within the kitchen appliance to insure that the food is cooked or baked to the proper degree of doneness. More particularly, under program control, the controller regulates the various operations of the kitchen appliance, such as the cooking time and temperature, for either a single food product or a plurality of food products. That is, the kitchen appliance is programmed to operate with cooking parameters tailored for a specific food product. See, for example, U.S. Pat. No. 4,920,948, which is incorporated herein by reference.

Moreover, the controller regulates the percentage of time power is applied to the heating (or cooling) element in accordance with the cooking parameters selected by the user. For example, the heating element or heating elements may be pulsed with either a fixed or variable duty cycle (proportional control heating), may be fully turned on, or operated in an off/on manner similar to a thermostat, depending on the heating mode of the kitchen appliance.

Moreover, such controllers may include built-in intelligent sensing and diagnostic equipment, which coupled through an interface board, detect and identify various types of failures. Such failures include faulty heaters, sensors, fans, and the like. See, for example, U.S. Pat. No. 5,043,860 and applicants' copending applications: U.S. Ser. No. 08/501,211 and U.S. application entitled "Diagnostic System For A Cooking Appliance" filed Oct. 26, 1995, Ser. No. 08/549,098, which all are commonly assigned and incorporated herein by reference.

With continuing reference to FIG. 1, kitchen base stations 150 ($B_1$-$B_6$) may be found within respective cells 105 ($C_1$-$C_6$). Preferably, each kitchen base station 150 ($B_1$-$B_6$) is capable of communicating through wireless means, such as through cellular radio or other wireless means, with corresponding kitchen appliances 110 ($A_1$-$A_{11}$). If desired, manual changes in the menus or the cooking profiles may be made through an appropriate terminal 155 attached to the base station. As such, each kitchen base station 150 ($B_1$-$B_6$) includes a RF transmitter 160 and RF receiver 165, as illustrated in FIG. 2. Wire interconnections are not desirable, due primarily to the likelihood of such wires being inadvertently cut by culinary instruments. It should, however, be understood that wire interconnections may be used. Of course, satellite, microwave or infrared communication may also be used in accordance with principles known to those skilled in the art.

Preferably, each of cells 105 ($C_1$-$C_6$) is allocated at least one cellular radio channel used to effect bidirectional communication so as to monitor and track the maintenance, repair and energy management of kitchen appliances 110 ($A_1$-$A_{11}$) by means of information transmitted to and received from those appliances. Such information may include cooking parameters, billing information, appliance identification, diagnostic information, and maintenance instructions, as discussed herein below. Those skilled in the art will readily note that the channels may operate either in an analog or a digital mode or a combination thereof. In the digital mode, analog signals are converted to digital representations prior to transmission over the RF channel. Purely data messages, such as those generated by microprocessor based controller 140 may be formatted and transmitted directly over a digital channel.

Communication is provided between kitchen base stations 150 ($B_1$-$B_6$) and a control center 170 through communication links 175 of a data network 180. Control center 170 may be attended by one or more trained operators through terminals 185. Digital links operating at 56 Kb/sec or higher may be used as communication links 175. The data network 180 may be an integrated system digital network (ISDN) facility. In this latter instance, the X.25 protocol, may be used for facilitating the sending of message data between kitchen base stations 150 ($B_1$-$B_6$) and control center 170. The X.25 protocol is well known to those of ordinary skill in the art and will not be discussed herein for the sake of clarity.

It should be understood that control center 170 includes a repair and accounting database 190 that permits the exchange of information relating to repair, accounting and billing. In addition, each kitchen base station 150 may contain internally resident databases necessary or useful in the customer billing or accounting process. Control center 170 may be, for example, located within the same physical location as the cells. For extended coverage around the world, however, a plurality of control centers linked to each other may be employed.

Each kitchen base station 150 ($B_1$-$B_6$) may interrogate a corresponding controller 140 or controller 140 may request to transmit diagnostic information relating to the operating conditions of kitchen appliances 110 ($A_1$-$A_{11}$), which diagnostic information may be immediately communicated to control center 170. It is contemplated that this diagnostic information may also be stored in internally resident databases of the kitchen base stations. Control center 170 may take action as appropriate, including, among other things, downloading updated diagnostic software to controller 140, dispatching a service vehicle 195 through a mobile kitchen center 200, or updating accounting and inventory information, which is discussed in more detail herein below. Most of the functions are automatically controlled by control center 170, but may be also performed manually by the control center operator. If desired, some of these functions may be distributed to the base stations.

Service vehicle 195 is provided, maintained and operated independently by the service agency subscribers to the system. Although FIG. 1 only shows one service vehicle, it should be clearly understood that in practice a fleet of service vehicles would be used.

Communication network 100 also is preferably linked to a generic point of sale (POS) or an automated teller machine (ATM) system 205 which is linked to each of kitchen base stations 150 through data communication network 180. Further ATM/POS system 205 includes a POS/ATM data communication network 210. Plurality of independently operated ATM/POS systems all intercommunicate simultaneously in order to provide billing service to subscribers of the inventive communication network. A clearing house data communication network also interconnects the plurality of ATM/POS systems to clearing house network centers. By transferring information among the different ATM/POS systems operated by various merchants, the clearing housing data communication network and the clearing house network centers allow direct inter-institution transactions, such as between ATM/POS system 205 and the particular ATM/POS system operated by the subscriber's financial institution.

Figure 3:
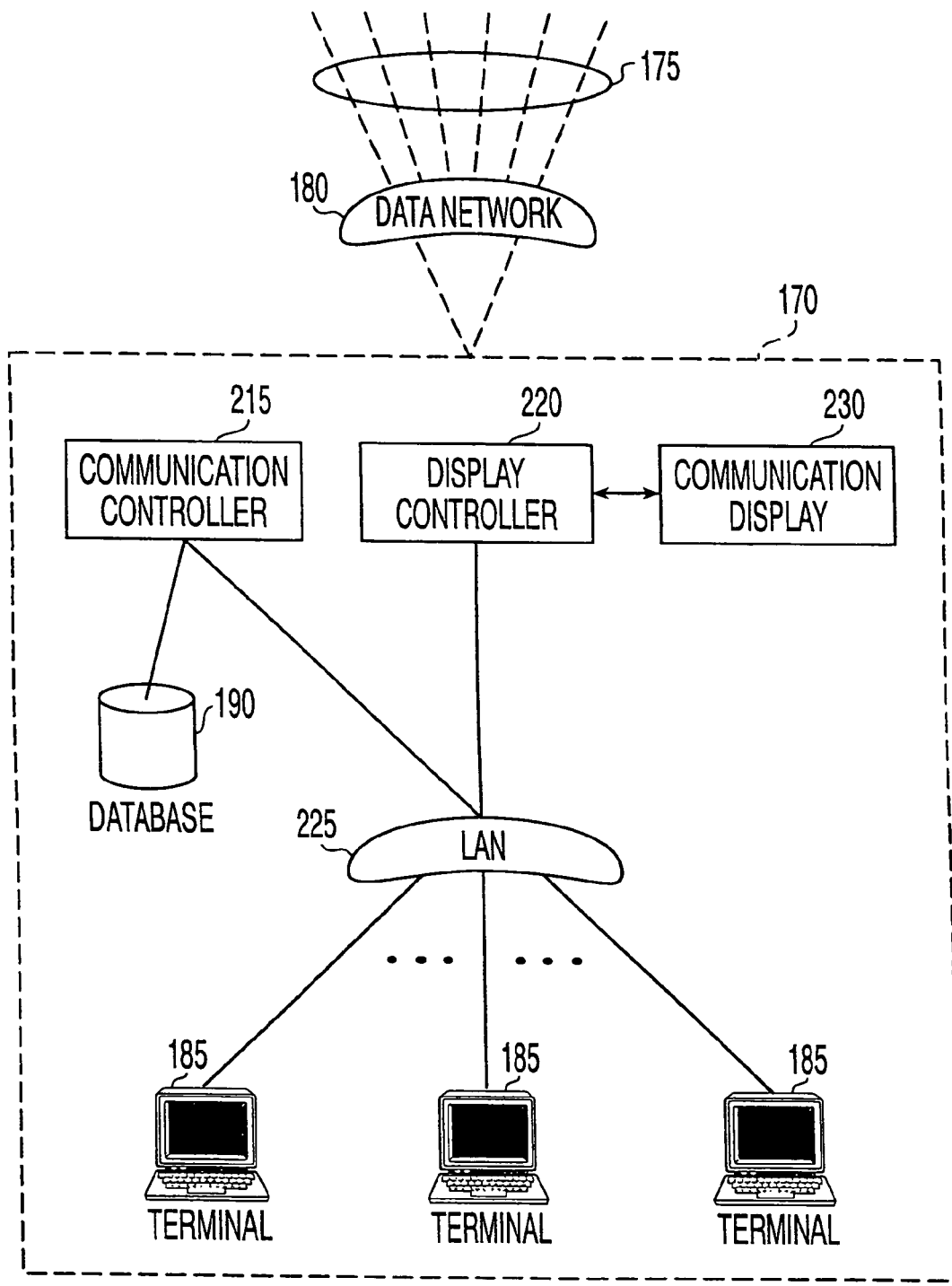
FIG. 3 is a more detailed block diagram of the control center of FIG. 1.

Referring to the illustration of FIG. 3, control center 170 may include a communication controller 215, and a display controller 220, there being a suitable conventional interface 225 therebetween. As stated above, control center 170 includes database 190 containing, for example, the locations of the kitchen appliances, diagnostic software, associated accounting and billing information, and energy management data, as discussed herein below. Interface 225 may be a local area network (LAN) interface, having one or more terminals 185, allowing control center operators to enter information. Terminals 185 are understood to include any of a variety of input devices such as a keyboard, mouse, trackball, or other user interface.

Figure 4:
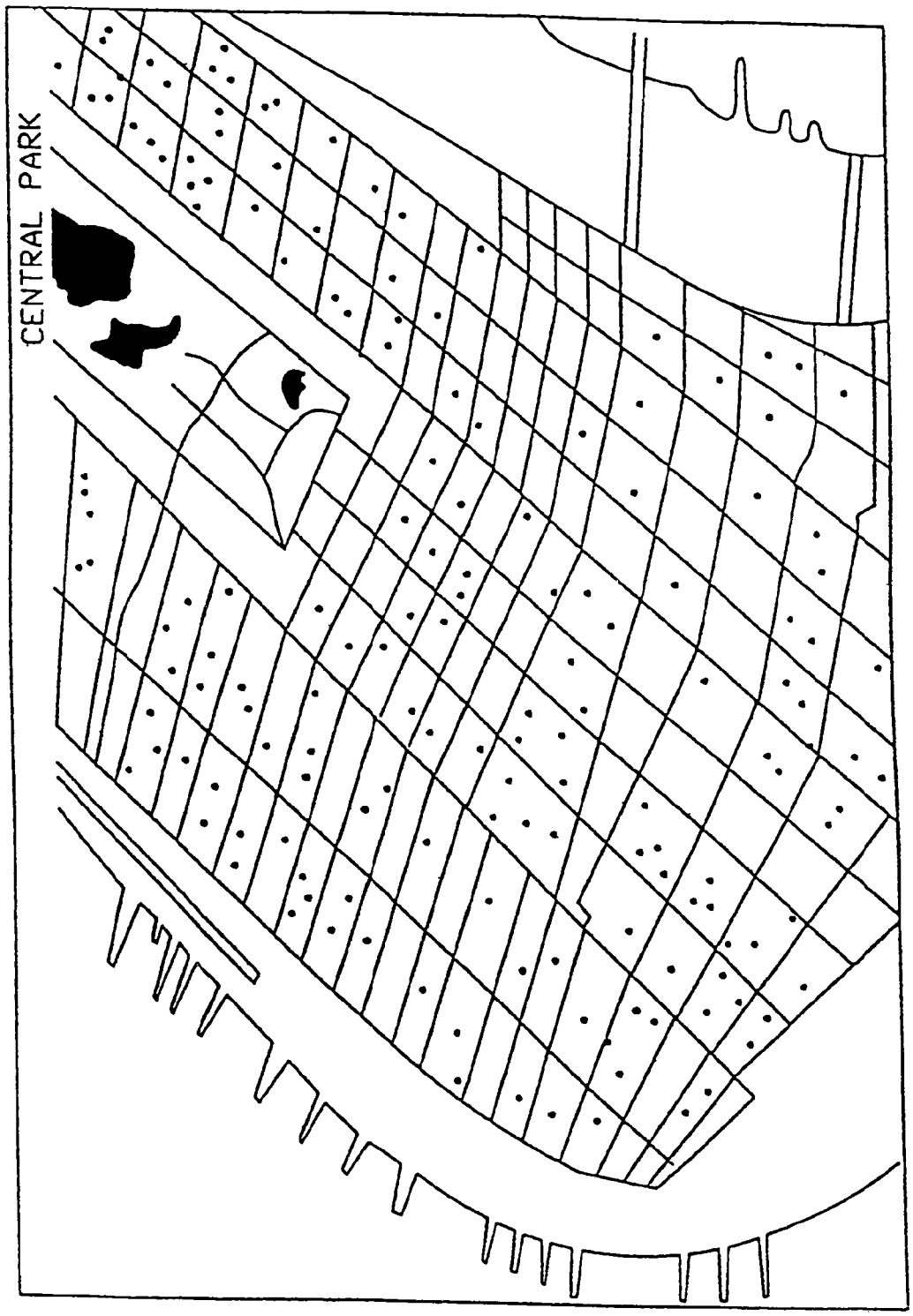
FIG. 4 is an exemplary illustration of a coverage map as it might be displayed to a control center operator.

Communication controller 215, among other things, serves as a processor and buffer between kitchen base stations 150, and display controller 220 and database 190. Data transmitted through communication controller 215 may be displayed on a communication display 230. Display controller 220 is provided with a map display which displays information regarding the kitchen appliances in a graphical manner, such as on pre-existing digitized maps of arbitrarily large geographical areas, such as a city or state. Such a coverage display is illustrated in FIG. 4. For example, appliances may be noted by dots, with those requiring service indicated in red. Other suitable legends may be displayed, for example, indicating the type of appliance, last service day, parts availability, among other things.

Figure 5:
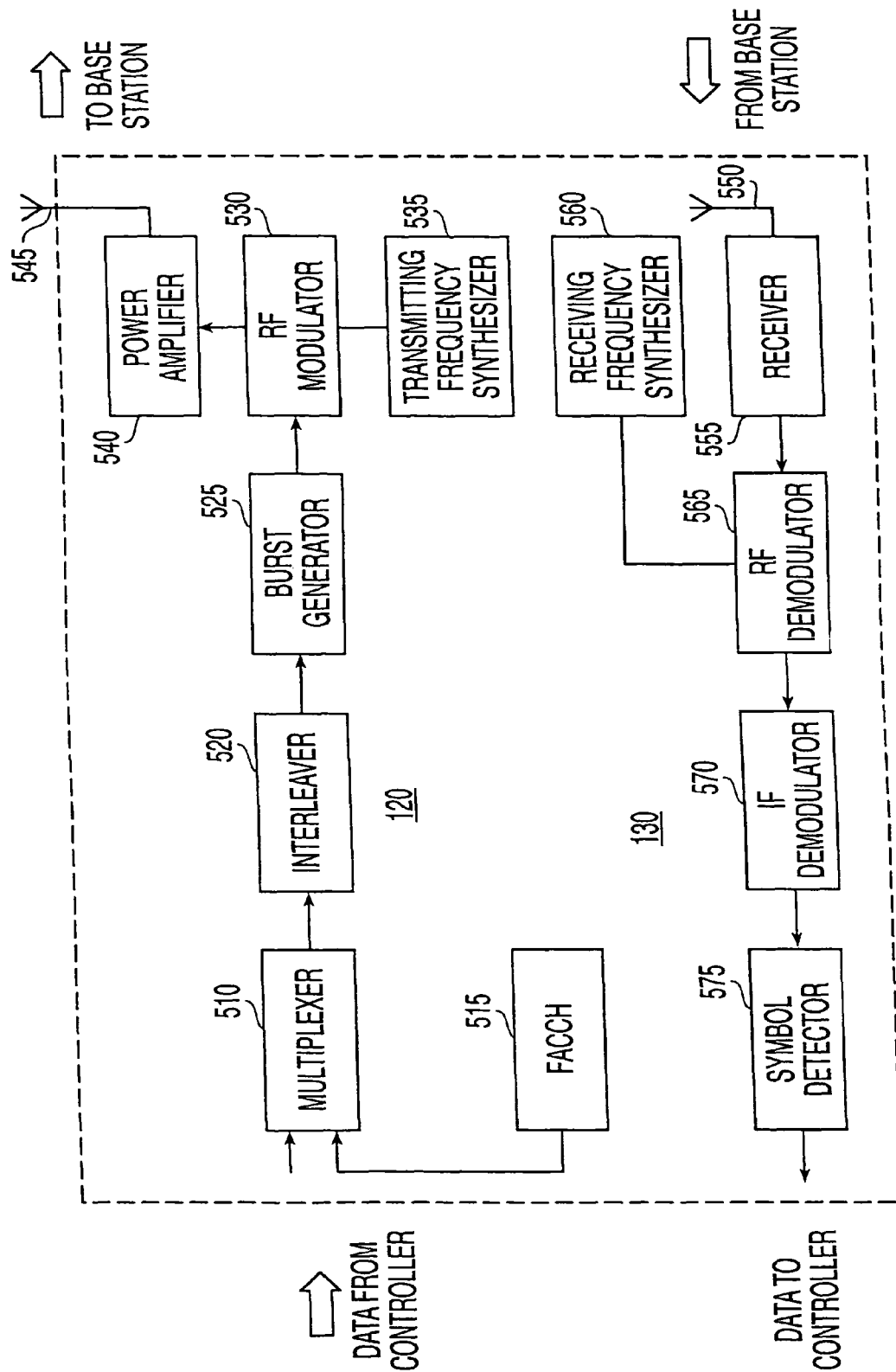
FIG. 5 is a block diagram of the transmitter and receiver of a kitchen or restaurant appliance used in accordance with the present invention.

Referring next to FIG. 5, there is shown therein a simplified schematic block diagram of the equipment for kitchen appliances 105 used to transmit and receive data from kitchen base stations 150 in accordance with the present invention. In particular, the equipment illustrated in FIG. 5, may be used for communication to kitchen base stations 150 over digital channels. Data destined for transmission to the kitchen base station is divided into data packets of messages in accordance, for example, with the time division multiple access (TDMA) technique of digital communications. Those skilled in the are will readily note that other techniques may be used, such as CDMA. Data packets along with supervisory messages generated by a so-called fast associated control channel (FACCH) generator 515 are time division multiplexed by multiplexer 510. The output of multiplexer 510 is provided as an input to a burst interleaver 520 that divides the data into n consecutive time slots, each occupied by a byte consisting of m bits of control information. This interleaved data forms the input to a burst generator 525 that produces "messages burst" of data, each consisting of a time slot identifier, digital verification code, control or supervisory information and the data to be transmitted.

The message burst produced by burst generator 525 is provided as an input to a RF modulator 530. RF modulator 530 is used for modulating a carrier frequency according to, for example, the π/4 DQPSK technique that is well known those in the art of cellular radio communication. The use of this technique implies that the information transmitted by each appliance transmitter is differentially encoded, that is two bit symbols are transmitted as four possible changes in phase: + or −π/4 and + or −3π/4. The carrier frequency for the selected transmitted channel is supplied to the RF modulator by a transmitting frequency synthesizer 535. The burst modulated carrier signal output of RF modulator 530 is amplified by a power amplifier 540 and then transmitted to the base station through an antenna 545.

Each appliance 110 receives burst modulated signals from kitchen base stations 150 through an antenna 550 connected to a receiver 555. A receiver carrier frequency for the selected receiving channel is generated by a receiving frequency synthesizer 560 and supplied to a RF demodulator 565. RF demodulator 565 is used to demodulate the received carrier signal into an intermediate frequency (IF) signal. The intermediate frequency signal is then demodulated further by an IF demodulator 570 which recovers the original digital information as it existed prior to π/4 DQPSK modulation. The digital information is then passed to symbol detector 575 which converts the two bit symbol format of the digital data provided to a single bit data stream. For a more detailed description on the use of cellular radio communication, see, for example, *Cellular Radio: Principles and Design*, Raymond C. V. Macario, McGraw-Hill, Inc. 1993.

Those skilled in the art will readily note that much of the equipment used by appliances 110 to effect cellular communication may also be used by kitchen base stations 150 and mobile kitchen center 200. Accordingly, for the sake of simplicity, that equipment will not be discussed herein. There is, however, one important difference. Kitchen base stations 150, unlike appliances 110, are preferably connected to control center 170 through high speed communication links of data network 180. Also, kitchen base stations 150 each includes a microprocessor 167 that controls the activities of the base station and communication among the appliances and the kitchen base stations. Decisions are made by the microprocessor in accordance with data received from control center 170. The microprocessor is also provided with terminal keyboard and display unit 155 that allows a user to exchange information with appliances 110 as well as with control center 170.

Figure 6:
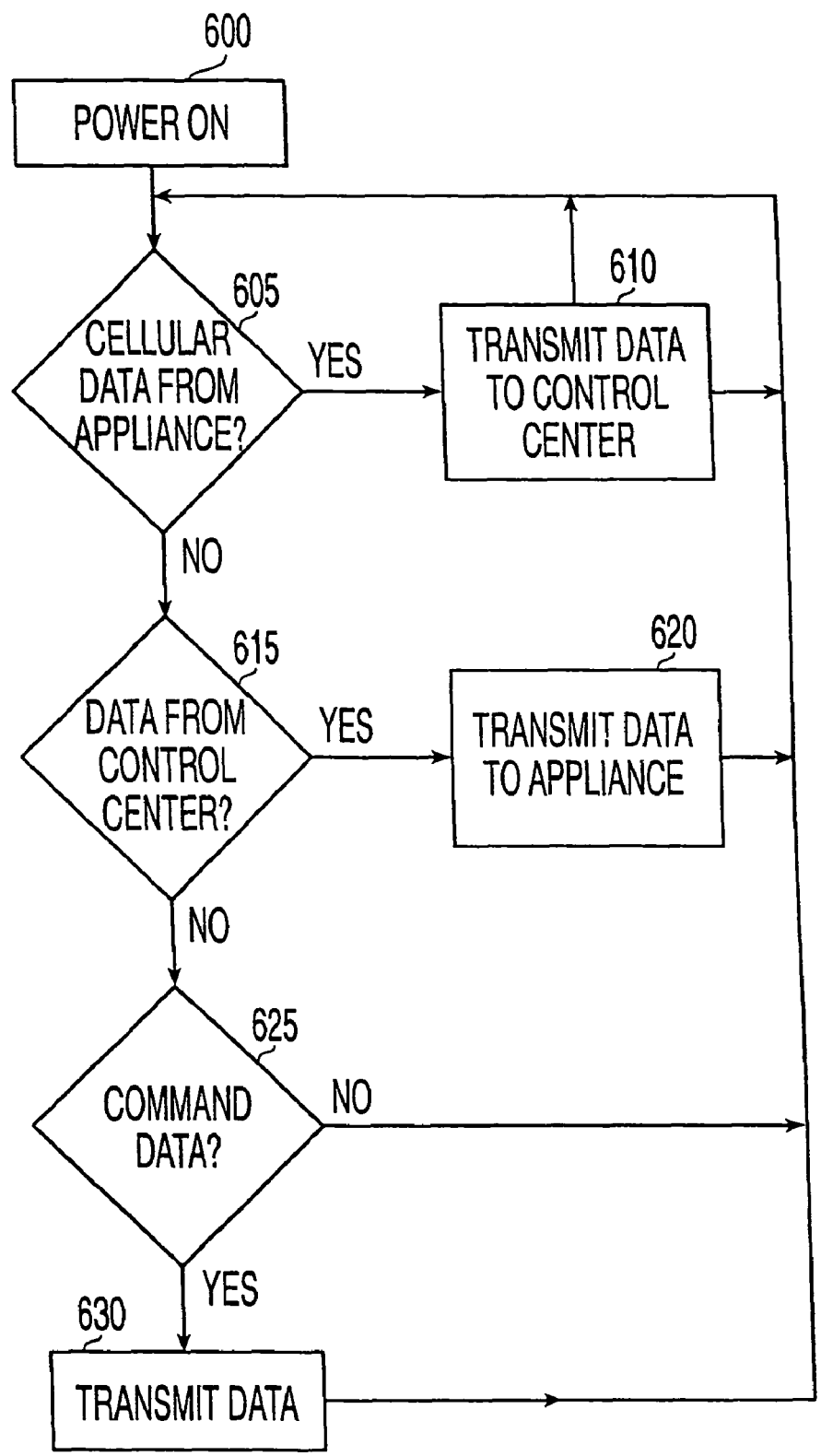
FIG. 6 is a flow chart illustrating the operation of the kitchen base station of FIG. 1.

FIG. 6 is a simplified flow chart illustrating the operation of the kitchen base station. Briefly, the flow chart includes a sequence of generally repetitive instructions arranged in a loop in which the station polls or is interrupted by special events and branches to an appropriate communication mode.

On power up at block 600, control passes to block 605 which determines whether data has been received from the kitchen appliances. Essentially decision block 605 determines whether the kitchen appliance(s) are communicating to the control center. If such communication is requested, control passes to block 610 to effect communication. Otherwise, block 615 determines whether the control center is attempting to communicate with the kitchen appliance(s). If so, at block 620 the received data is forwarded to the appropriate appliance. Control then passes to block 625 which determines if an operator has entered any message data, either to an appliance or the control center. Any such data is then transmitted at block 630.

In general; an application-oriented protocol is used to coordinate the activities between the appliances and the control center to ensure common syntax semantics for the transmitted application data. For example, the application-oriental protocol may specify a particular type of encoding for appliance identification data as well as the origination of such information with a message. The application-oriented protocol formats the messages and transmits either to the kitchen appliance or the control center. Control center 170 may transmit, for example, updated diagnostic software for the appliance, updated cooking profiles, and in general, data associated with the operations of the kitchen appliances. On the other hand, data transmitted from the kitchen appliance may include identified failures or malfunctions in the cooking appliance, including kitchen appliance identification information.

Normally, monitoring and tracking control passes to the control center after a malfunction or fault has been reported by the microprocessor based controller. However, the control center may effect preventive maintenance even when there is no malfunction reported. Scheduled preventive maintenances are stored in database 190. Alternatively, each base station may request preventive maintenance for its associated kitchen appliance(s). At the appropriate time, control center 170 dispatches a service vehicle.

Figure 7A:
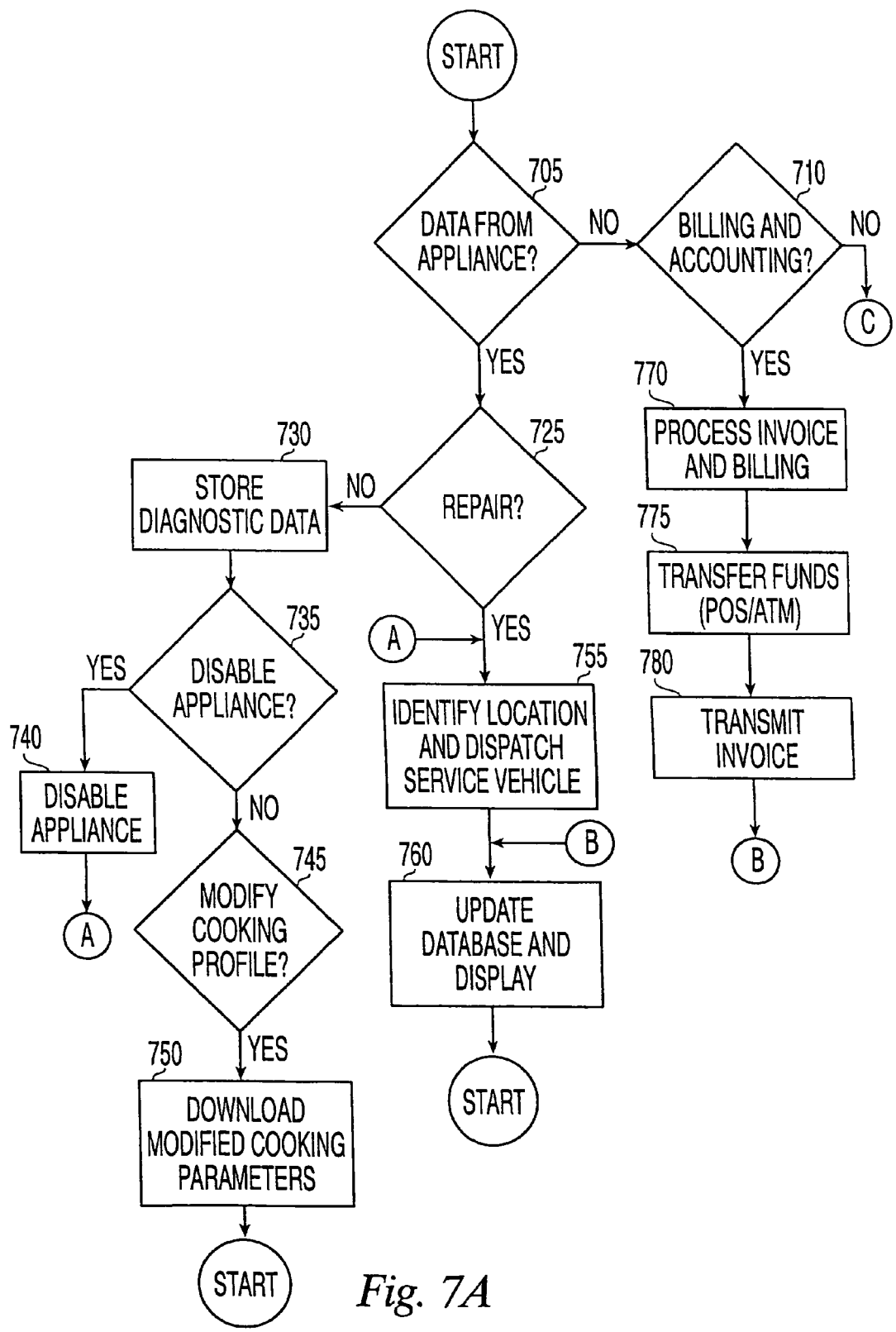
FIGS. 7A and 7B are flow charts illustrating the operation of the control center of FIG. 1.
Figure 7B:
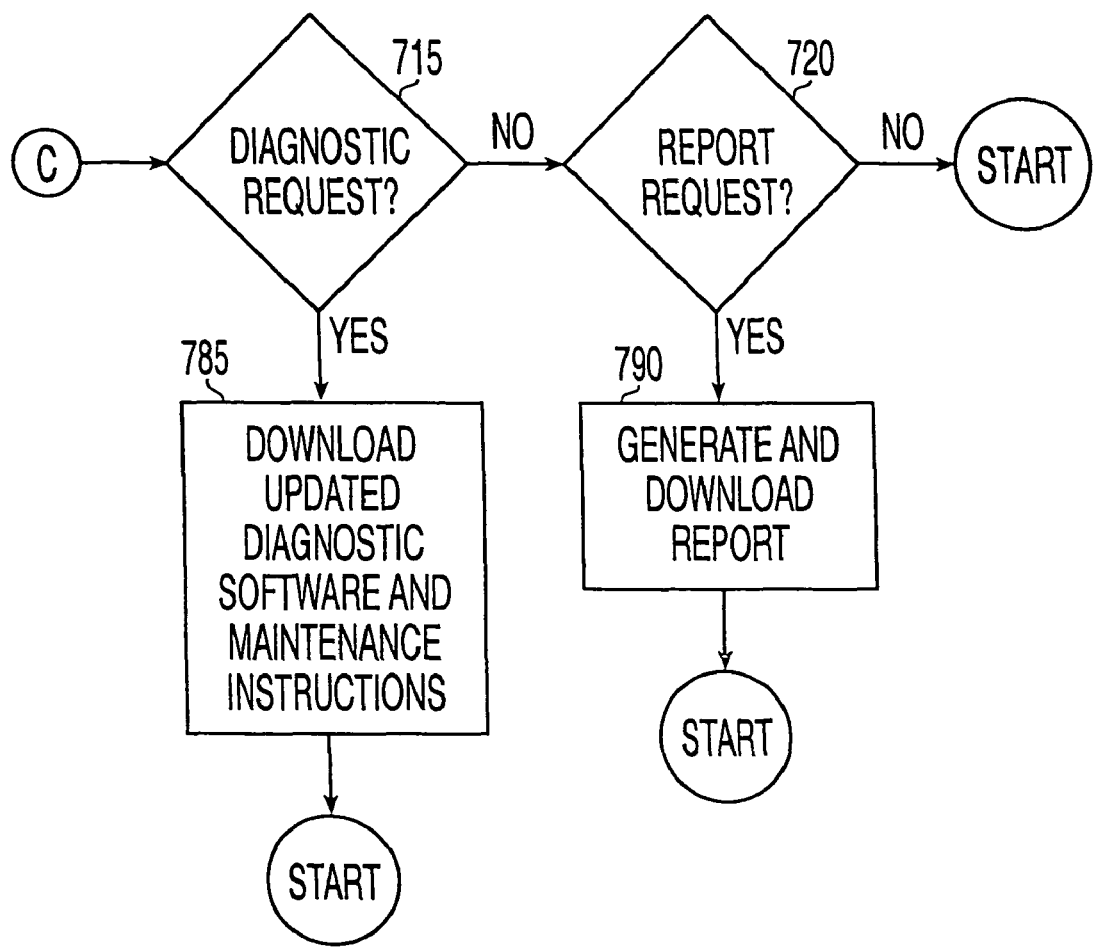

Referring now to FIGS. 7A and 7B, the operation of the control center is illustrated. FIGS. 7A and 7B show the manner in which the control center in the present embodiment tracks and monitors repair and maintenance. In most instances, it is understood that the control center initializes service only to effect repair or preventive maintenance. Integrated with this function is the system's capability to effect billing and accounting.

Normally, message data from the appliances consists of four different types: repair, billing, diagnostic or reports. At decision blocks 705, 710, 715 and 720, control center 170 determines which type of message data it is. Block 705 checks for repair message data. If, in decision block 725, a repair request has been received from the appliance, control then passes to block 755 which, once identifying the location of the appliance and the nearest service agency, dispatches a service vehicle.

Those skilled in the art will readily note that the network system of the present invention allows the control center to monitor kitchen appliances located over wide geographical areas for early warning of failure or degradation in performance. If the degradation, however, is gross, the control center may communicate and display on the console of the kitchen appliance a message warning that the kitchen appliance is unacceptable for cooking purposes. If desired, the control center may be programmed in the latter instance to disable the kitchen appliance to eliminate any possible health risks. Alternatively, the cooking parameters of the kitchen appliance may be changed to compensate for the malfunctioning appliance until repairs can be effected.

Once a service vehicle has been dispatched, any graphical display of the appliances as well as database 190 is updated to indicate the current status of the appliance under service, as noted at block 760.

It is contemplated that the control center responds to diagnostics information transmitted periodically by the appliance. At block 730, such diagnostic information is stored in database 190. This diagnostic information may include, but is not limited to the information indicated below:

---

Appliance Location
Appliance Type
Controller Type
Diagnostic Software Version
Last Repair Date
Next Maintenance Date
Time Stamp
Date Stamp
Type of Malfunction
    Heaters
    Fans
    Power supplies
    Sensors
    Electronics
    Software -continued Statistical Cooking Data
    Hours of Operation
    Deviations From Operating Temperature
    Deviations From Normal Operating Temperature
Gradients
    Cooking Profiles
        Time
        Temperature
        Fan setting
        Humidity setting
        Rotation Setting (for rotisserie)
        Belt Speed
        Damper Position
        Microwave Energy Setting
        Refrigeration Time and Temperature

---

According to the preferred embodiment, control center 170 analyzes at block 735 such diagnostic information so as to determine whether to disable the appliance at block 740 or at block 745 to modify the cooking profiles stored in the appliance. Such analysis may use the techniques disclosed, for example, in U.S. Pat. No. 5,043,860, U.S. Ser. No. 08/501, 211 and U.S. Patent application entitled "Diagnostic System For A Cooking Appliance," (Ser. No. 08/549,098), filed Oct. 26, 1995. The generation of other such diagnostic-specific software may be realized by those programmers of ordinary skill in the art of cooking. For example, it is contemplated that such diagnostic software may use artificial intelligence or so-called "fuzzy-logic."

Such diagnostic information stored in database 190 may also be later retrieved and used for quality control to determine the frequency and type of failures for specific types of kitchen appliances.

By way of reiteration, based on information transmitted to control center 170, a repair person may be dispatched to the site of the kitchen appliance requiring service or preventive maintenance. This dispatch can be effected through radio communication (e.g., mobile kitchen station 200) or through the use of an ordinary telephone to the appropriate service center nearest to the location of the kitchen appliance.

Figure 8:
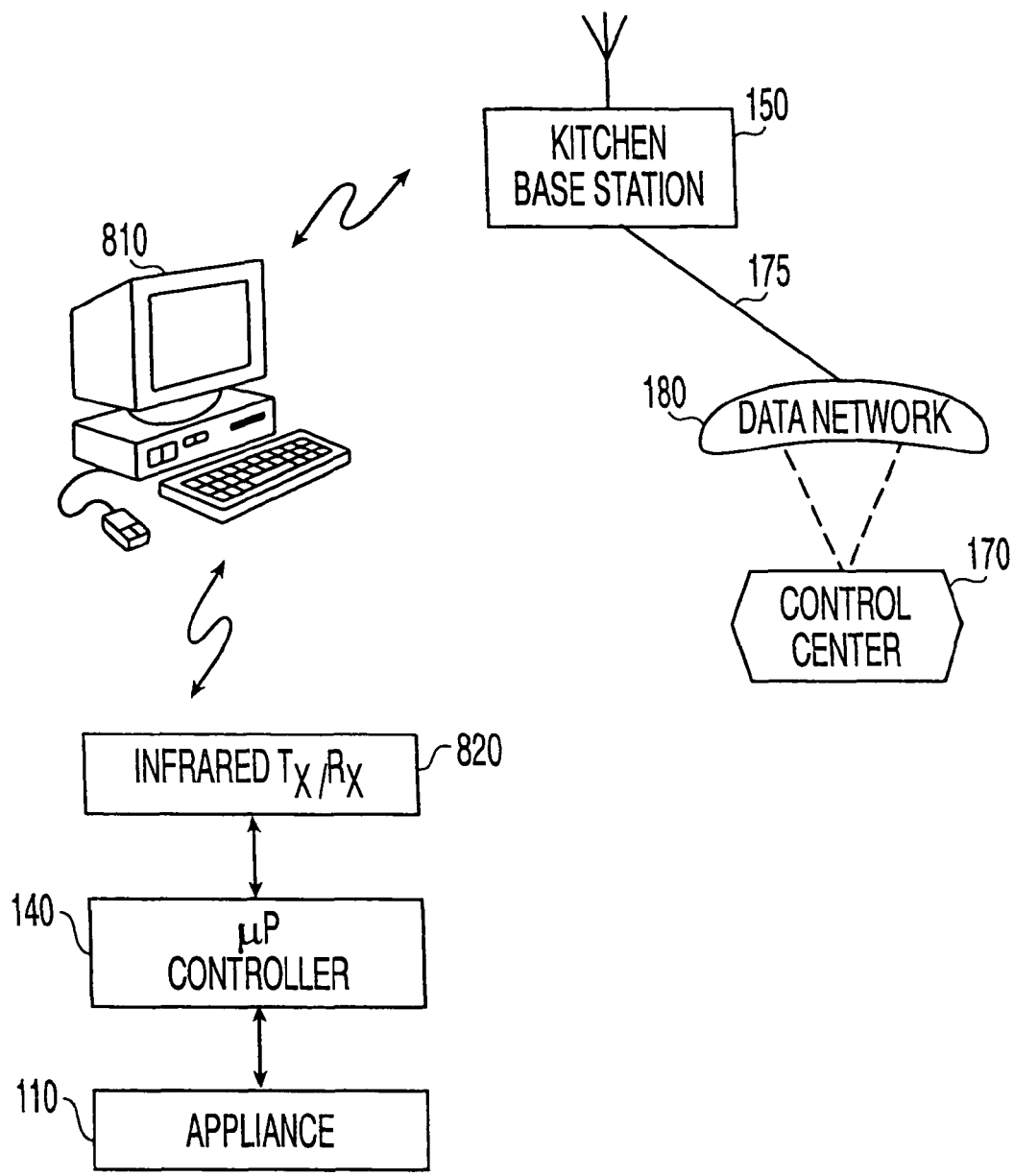
FIG. 8 is a pictorial representation of the repair process used in accordance with the present invention.

Referring to FIG. 8, on site repair is enhanced through the use of a portable hand held terminal 810 having, for example, a Palm/Laptop computer linked to microprocessor based controller 140 by a suitable interface, such as, for example, a wireless RS-232 interface using infrared communication. Of course, wireline or optical interfaces may also be used. Such hand held pocket computers are readily available from Texas Instruments, Hewlett Packard and Casio, among others. Hand held terminal 810 interrogates the controller so as to ascertain the model and model number of the appliance under service, and then diagnoses abnormal operating conditions. Of course, should infrared communication be used, controller 140 is equipped with an infrared transmitter/receiver 820. The low-level software is readily capable of implementation by those skilled in the art. For example, conventional database management software may be employed in the hand held terminal along with suitable diagnostic software. It is contemplated that such software and the like, for example, may be stored in standardized memory cards conforming to both the JEIDA and PCMIA standards. Both standards are substantially identical for use in 68 pin interchangeable memory cards.

Hand held terminal 810 also has a local RF receiver and transceiver provided with an antenna by which it communicates to control center 170 via kitchen base station 150. Cellular communication to the kitchen base station may be effected as discussed above herein. To preserve the data contents of the hand held terminal, a memory back-up battery is preferable.

Prior to effecting repairs, terminal 810, however, may request from control center 170 the associated accounting and service information associated with the appliance under service. This is illustrated in block 710 of FIG. 7A. Such accounting and service information includes, but is not limited to:

Customer Name
Customer Location
ID
Service Area
Account Number
Bank
Service Warranties
Credits Upon effecting repair, control center 170 prepares and transmits at block 770 an appropriate invoice. The subscriber or an authorized person thereof then enters a security password or code, such as a personal identification number (PIN) authorizing funds to be transferred from the subscriber's institution to the service agency that performed the repair or maintenance. Alternatively, an unauthorized signature may be digitalized and captured. Upon approval, control center 170 at block 775 initiates a transfer of funds from the customer's or subscriber's financial institution to the account of the service agency. Once completed, the invoice is transmitted at block 780 to terminal 810 which then prints a hard copy of the invoice.

Those skilled in the art will readily recognize the advantages of this integrated billing and accounting services inasmuch as this eliminates the need for any accounting back at the office of the service agency.

Alternatively, inasmuch as hand held terminal 810 contains the billing records for the appliance under service, the invoice may be prepared by hand held terminal 810. In this latter case, hand held terminal 810 is embedded in memory with the standard billing and invoicing format. Once prepared, the billing records may be transmitted to control center 170. In this manner, some of the accounting functions may be distributed or off loaded to the hand held terminals. Of course, those skilled in the art will readily realize that kitchen base stations 150 may also be programmed to prepare the invoice. These latter choices are dependent on whether the network is structured as a highly centralized or distributed architecture.

Once repairs have been made, control center 170 then updates the accounting, billing and maintenance records within the database. Also, control center 170 may update inventory, taking into account any parts used in making the repairs. In this manner, service personnel may later readily ascertain the availability of parts for a particular appliance, such as through hand held terminal 810.

During repairs, should terminal 810 require updated diagnostic software for the particular appliance under service, such a request is transmitted to the control center. Such a request is responded to at block 715, with the appropriate software then transmitted to terminal 810 via the communication network, as indicated at block 785. In this manner, as new diagnostic tools become available for specific kitchen appliances, they are now readily accessible for use by the food service industry.

Similarly, database 190 may contain maintenance instructions for each type of kitchen appliance. If the service personnel is unfamiliar with the appliance, a request may be initialized for control center 170 to download the necessary repair and maintenance instructions for the appliance under service.

Importantly, control center 170 includes database 190 containing customer information, accounting history, appliance data, such as previous repairs and faults, updated diagnostic software and billing data. Advantageously, this allows service personnel as well as control center operators to update credits, warranties, or returns for a particular subscriber in real time. Also, service personnel may request at block 720 for center 170 to generate and transmit various records for a specific subscriber or appliance as indicated below;

Payment History
Maintenance History
Appliance Part Inventory
Customer Data
Prior Repairs or Malfunctions
Warranty Records Such capabilities enhance quality control as well as minimize the amount of work performed by service personnel on administrative tasks. Database management software running under UNIX may be employed in control center 170, which is readily capable of implementation by those skilled in the art.

Also, it is contemplated that the control center may, if desired, control in real-time the normal operation for some or all of the kitchen appliances. For example, to effect a change in a recipe for a particular food product, new cooking parameters may be communicated to the controllers of each desired kitchen appliance. In this manner, retail food service chains, such as McDonald's® or Burger King®, may readily update the cooking profiles of their food products on a global basis.

Those skilled in the art will readily understand that during normal operation, the controller of each kitchen appliance regulates the percentage of time power is applied to the heating means in accordance with the stored cooking profiles of the food products. For example, the heating means may be pulsed with either a fixed or variable duty cycle, may be fully turned on, or operated in an on/off manner similar to a thermostat. The specific control algorithm is based on the particular type of kitchen appliance being controlled, for example, fryer, oven, air conditioner or the like.

In accordance with principles of the invention, it is further contemplated that the control center may, if desired, alternatively control in real time the peak power demand of the kitchen appliances, for example, in accordance with the relative priorities thereof. Of course, each base station may control the peak power demand, if desired. That is, the control center controls the amount of power utilized by the kitchen appliances within each cell or cells by controlling when various heating (or cooling) means of the kitchen appliances are turned "on." This is especially important inasmuch as one of the key parameters in determining electrical rates charged by a utility company is determined by the peak power load within a specific period of time. Normally, the utility company charges a customer a higher rate to deliver a higher peak power.

Advantageously, a minimum peak power can be achieved by limiting the number of kitchen appliances that are turned on at any one time. Moreover, the kitchen appliances can be prioritized so that desired appliances can be serviced first with respect to energy management, depending on the nature of the appliance and its relative priority or importance to the user.

Included in the diagnostic information periodically transmitted to control center 170 may be the actual power demand of the kitchen appliances. During normal operation, control center 170 determines the limit for the maximum power demand within each cell or desired number of cells. Preferably, the maximum power demand for each cell is user programmable and is stored, for example, in database 190. The actual power demand is dependent on the type and number of the kitchen appliances in each cell or cells. If the actual power demand exceeds the maximum power demand limit, control center 170 may reduce the duty cycle of at least one of the kitchen appliance as discussed in more detail herein below. That is, the "OFF" period of the duty cycle of one or more appliances is lengthen. It should be understood that the duty cycle herein refers to the amount of time the electrical load, e.g., the heating or cooling element, within the kitchen appliance is powered "ON" and "OFF."

In other words, the system determines whether the maximum demand will be exceeded by comparing the calculated load to the maximum system load value. The maximum system load value is user programmable. The calculated load is determined by factoring the power requirements of the appliances currently operating within the cell or cells. It is contemplated that the user has the capability to change the system configuration, by entering the power requirements of each appliance, the priority of the appliance and other parameters such as the control algorithm used in regulating the temperature.

Preferably, each kitchen appliance is preprogrammed with a minimum power On/Off duty cycle to ensure that the appliances operate acceptably. For example, during idle, the duty cycle may be varied greatly. Also, for those appliances having mechanical relays which deteriorate when exercised frequently, it is desirable to limit the frequency that the relays are closed or opened. This is achieved by preprogramming and following minimum On/Off times. For example, the minimum "ON" time might be 4 seconds and the minimum "OFF" time might be 2 seconds.

When control center 170 determines that the maximum demand in a cell or desired number of cells will be exceeded, selected kitchen appliances with the lowest priority and powered "on" for the minimum time are placed into a power cycle "off" state by control center 170. Inasmuch as controller 140 and thus control center 170 knows whether the appliance is in an idle or cook mode, the appliance can judiciously be turned off without affecting the operation of the appliance. Alternatively, base station 105 may place the appropriate kitchen appliance in the power cycle "off" state and inform control center 170 of its actions. Additionally, other kitchen appliances, which may not be currently operating, may have their "off" time extended by control center 170, which is effected through communication to and from the corresponding microprocessor controller 140. For example, when the maximum demand level is exceeded, lowest priority appliances on for the minimum "ON" time are turned "OFF." Then, low priority appliances will have their "OFF" times lengthen by, for example, one second. After an evaluation delay time, power demand of appliances within the cell or cells are evaluated again and appropriate action taken, including, if necessary, shortening the "OFF" times on a priority basis.

In the above manner, control center 170 preforms a so-called "load leveling" algorithm to bring the power demand level within each cell or cells within a "safety" band". Such a "loading leveling" algorithm may be required when additional kitchen appliances within each cell or cells wish to go online.

It should be understood that the above safety band is a range below the maximum allowed demand which allows the kitchen appliances to operate in a cycled manner, e.g., variable duty cycle or pulsed. When the power demand is below the safety band there is power capability to handle more appliances for operation. When the demand is within the safety band, the appliances within the corresponding cell are said to operating harmoniously. When the power demand is below the safety band the control center adjusts the allowable "OFF" times of the kitchen appliances by shortening the "Off" time of prioritized appliances.

The maximum safety band is programmable and may, for example, be set to 5% of the maximum demand. The result is that all appliances under control within a cell will be controlled without interruption up to the maximum demand level. When the maximum demand level is exceeded, the power cycling of the lowest priority operating kitchen appliance is modified by reducing the duty cycle. The portion of the maximum cell load allocated to each appliance is programmed into the control center. Allocation of the maximum cell load is performed by determining the total maximum cell load requirement and the desired maximum cell load. Such information may then be used to calculate the percentage of load each appliances contributes to the total power load. For example, a appliance rated at 2 Kw within a cell with 40 Kw of appliances contributes to 5% of the load. With a desired maximum system load of 20 Kw, the appliance uses 1 Kw of the maximum load.

Preferably, the present network accumulates the on/off state of each kitchen appliance at one second intervals or less for a 15 minute time period. This latter data is used to determine the current peak power demand. Those skilled in the art will readily recognize that the appliance priorities vary as to the time of day. For example, fryers would have a lower priority in the breakfast menu time than a lunchtime when they are heavily used. Accordingly, it is contemplated that the appliance priority may be user programmed to vary with expected demand.

Another uniqueness of the present SCK network is that company assets may be readily audited without the need of sending auditors into the field. Indeed, the control center would not only have a database of the locations of the appliances, but what their statistical failure rates were, which service agency had the parts and inventory for a specific appliance, among other things. Compared with the prior art philosophy of reacting to malfunctions, the present system actively monitors the performance of the appliance, providing not only a quality control function, but minimizing in the long, run repair cost.

It should be emphasized that the above described flow charts are merely examples of the how the system may be programmed in order to effect the tracking and monitoring of activities directed to billing, repair and maintenance. Other application-specific software may readily be realized by those skilled in the art and who have been equipped with the understanding of the operation of the present invention as set forth in the above description.

Accordingly, it should be understood that the embodiment herein is merely illustrative of the principles of the invention. Various modifications may be made by those skilled in the art which will embody the principles of the invention and fall within the spirit and the scope thereof. For example, hardwired, fiber, infrared or microwave communication channels may be used to link the kitchen or cooking appliances to the control center. Furthermore, the some of the repair and accounting services may be distributed or off loaded to the base stations.

Appliance Status/Monitoring

Figure 9A:
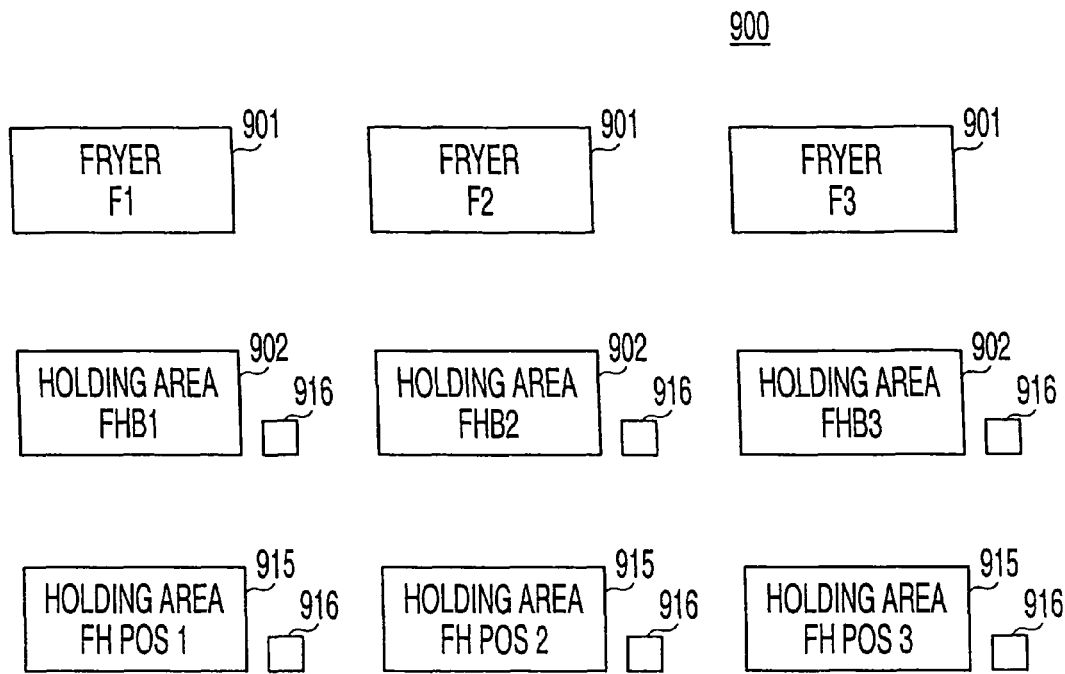
FIG. 9A is a schematic diagram representing a flyer and food hold arrangement for a commercial kitchen including a plurality of fryers and food holding areas.
Figure 9B:
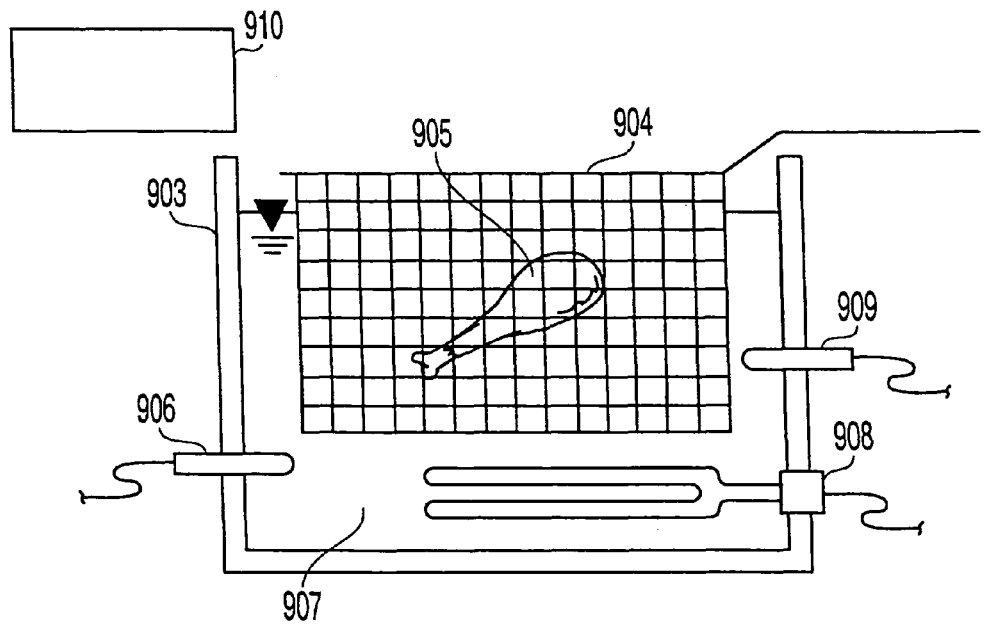
FIG. 9B is a schematic diagram representing a deep vat fryer and various appurtenances.
Figure 9C:
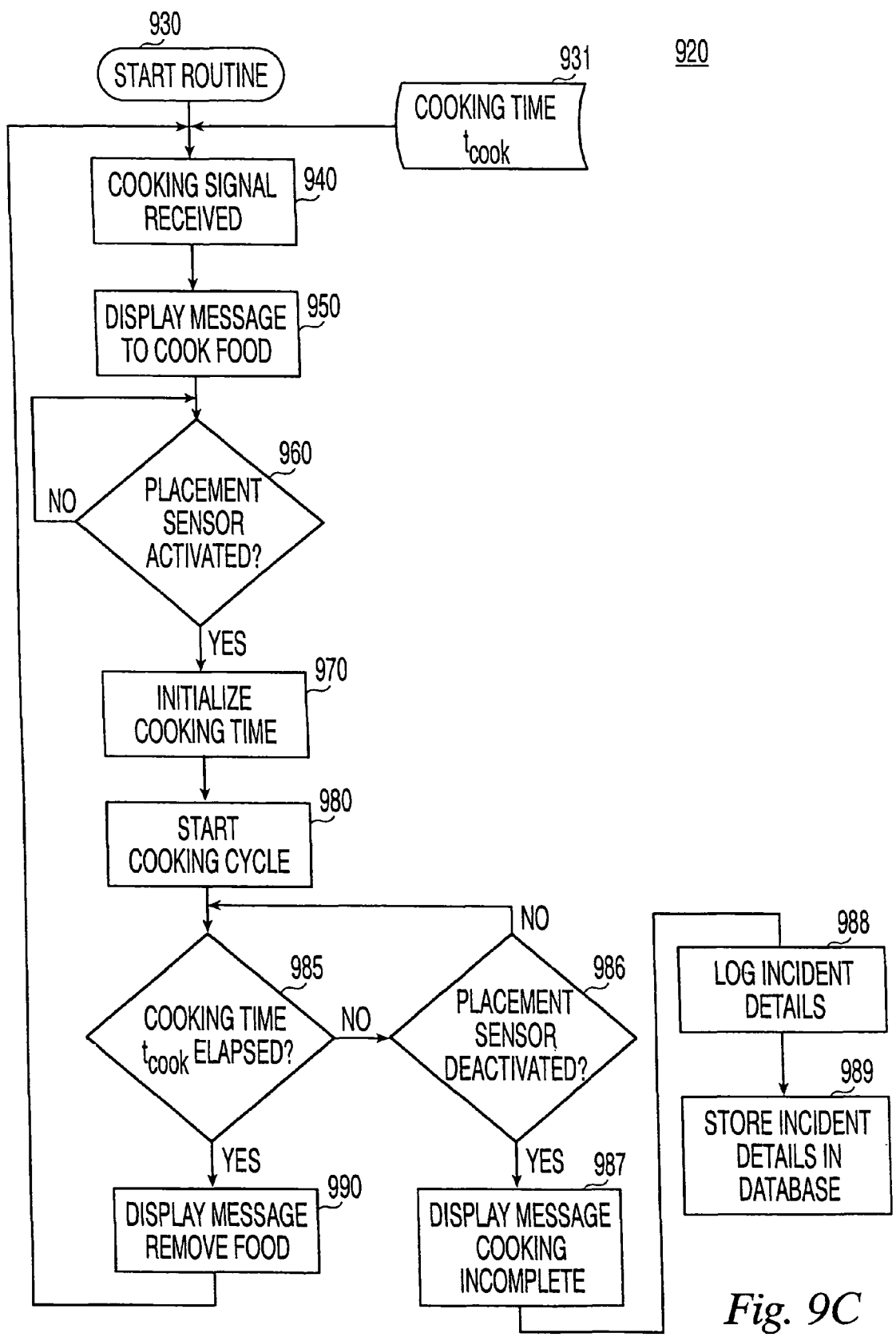
FIG. 9C is a flow chart showing exemplary control logic of the system for automatically verifying the completion of cooking appliance related tasks that are performed manually.

Referring now to FIGS. 9A, 9B, and 9C, the system of the present invention may be used to automatically determine whether and when various kitchen appliance-related cooking or maintenance tasks have been completed and/or properly performed by an employee. The system can accomplish this by detecting or sensing various operating parameters associated with a particular appliance. This eliminates the need to rely on the employee to manually activate a "bump bar" (typically associated with a CRT display) to notify the system that a cooking or maintenance task has been completed. The determination of task completion based on sensed parameters rather than by an indication by an employee reduces the possibility that an employee will take shortcuts or cheat in performing a required task and reporting its completion to the system via the bump bar. In fact, the present invention eliminates the need for a bump bar as a means for the employee to communicate with the system.

In one embodiment, for example, the system may be used to verify the proper cooking of a food product prepared by batch cooking in a deep vat fryer. Referring to FIG. 9A, a typical restaurant or other food preparation establishment kitchen 900 may contain several deep vat fryers 901 ($F_1$-$F_3$) having microprocessor based controllers, several food holding areas 902 ($FHB_1$-$FHB_3$) located in the back of the kitchen in a staging area, for example, and several food holding areas 915 ($FHPOS_1$-$FHPOS_3$) located at the point of sale (POS) for delivery to the consumer. Food holding areas are well known in the art and are used to hold or keep food after it has been cooked until it is ultimately sold to the consumer. Although food holding areas may be unheated, they often may have a heat source to keep the cooked food at a selected temperature to extend the shelf life of the cooked food product before it must be discarded when its holding time expires. Such heat sources may include, but are not limited to infrared radiation, heat bulbs, electric heaters, steam heat, gas heat, hot air blowers, etc. Alphanumeric data entry keypads 916 may also be provided with the food holding areas 902 and 915 whose purpose will become apparent in the discussion below on FIG. 10A. Once food is finished cooking in any of the fryers 901, it may placed and held in any of the food holding bins 902, or alternatively may be placed directly and held in any of the food holding bins 915 at the POS if consumer demand is immediate. The restaurant management and employees may decide into which holding bins 902 or 915 the food is placed, or alternatively, the selection may be dictated automatically by the system as described below with the discussion on FIG. 10A.

Referring now to FIG. 9B, the physical cooking hardware associated with each deep vat fryer 901 may consist of a deep vat 903 into which is inserted a cooking basket 904 that holds the food product 905 while it is cooking. A placement sensor 906 is located inside vat 903 which provides verification that cooking basket 904 has been inserted (placed) into or removed from the fryer. The placement sensor 906 may be a toggle-type electrical switch, proximity sensor, or any other type switch or sensor as will be readily known to those skilled in the art that is capable of providing a means for detecting that the cooking basket has been inserted into or removed from the fryer. Cooking medium 907, typically oil or shortening, is provided along with at least one heating element 908 which increases and maintains the temperature of the medium $T_{medium}$ at the proper cooking temperature $T_{cook}$. A temperature sensor 909 is also provided with the deep vat 903 to measure the temperature $T_{medium}$ of the cooking medium 907. A CRT monitor 910 is provided to serve at least one fryer 901 and is used to display information communicated to the food preparer(s) from the system of the present invention. However, a single CRT monitor 910 may provide service to more than one fryer 901 and/or food holding bin 902.

Exemplary control logic that may be used with the system of the present invention for controlling the proper cooking of food product 906 in the deep fryer 901 described above is shown in FIG. 9C. This control logic may reside and be implemented in a kitchen base station or the control center, at the system user's discretion. The kitchen base station and control center data processors may be, but are not limited to, a conventional stand-alone computer unit or several interconnected and networked units capable of executing the necessary arithmetic and logic operations, and carrying out the required communication and networked functions of the invention. Indeed, any type or combination of microprocessors or processors capable of executing the operations required by the system described herein are suitable for use in the invention and will be readily apparent to those skilled in the art. The computer unit or networked computers may be provided with all necessary peripheral devices (e.g., modems, printers, scanners, CRT displays, etc.) whose selection will be readily apparent to those skilled in the art. The type of peripherals selected is a matter of design choice and dependent upon the specific intended application of the system.

Logic process 920 begins the cooking and control process in step 930. In step 940, the system receives a cooking command signal to start preparing a batch of food product 906. The decision to cook another batch of food product 906 may be determined manually by, for example, a food preparer. In this case, the food preparer may simply push a button located on the appliance to initiate sending the cooking command signal to the system, which signal is received in step 940. Alternatively, the cooking command signal may be input into the system electronically by any number of system input interface methods (e.g., via a keyboard, voice command, wireless device, etc.). The employee may also designate and input the type of food product 906 to be cooked (e.g., fried chicken, fried fish, french fries, etc.) into the system.

The cooking command signal may also be automatically generated by the system of the present invention based on input received from the POS (point of service) system or other system-based determinations. For example, the POS system may recognize a demand for fried chicken which exceeds the current inventory, based on a comparison of the number of customer orders received with available supplies of fried chicken on hand in the food holding bins 902 and 915. The system then generates the command signal to cook more fried chicken to ensure an adequate supply is available to meet the anticipated demand.

Still referring to FIG. 9C, the control logic is pre-programmed in step 931 with the proper cooking time $T_{cook}$ for the particular food product 906 to be prepared. Cooking time $T_{cook}$ represents the total cooking time required to properly cook the food as a function of the cooking medium temperature $T_{medium}$. This information may be electronically stored in a lookup table or database accessible to the system. Where deep vat fryers 901 ($F_1$-$F_3$) are used to cook different types of food products 906, the proper cooking time for each type may be stored in the lookup table or data base, and then be automatically determined by the system from the cooking command signal which identifies the variety of food product to be cooked. The system may be used to assist in determining the cooking time $T_{cook}$ by sensing and reading the temperature of the cooking medium $T_{medium}$ via temperature probe 909 in fryer vat 903. The system then accesses the lookup table or database into which has been input various cooking times $T_{cook}$ versus cooking medium temperatures $T_{medium}$ for any number of types of food products 906.

Responsive to the signal generated in step 940, the system may provide an audiovisual indicator, which may be either an audio warning or a visual message displayed on a CRT as shown in step 950, instructing the food preparer to cook food product 906. The food product may be identified by name in the message (e.g., fried chicken, fried fish, french fries, etc.) which has been programmed into the system and input into the cooking time $t_{ook}$ lookup table or database. This message may be displayed on CRT monitor 910 as shown in FIG. 9B. The system next performs a test in step 960 to determine if the placement sensor 906 has been activated, thereby providing an objective, positive indication that the food preparer has inserted the food basket 904 with food product 906 into the fryer vat 903. If the placement sensor 906 has not been activated, control returns to step 960 to repeat the test. The logic can also be configured to deliver a second, renewed instruction if the desired action contained in the initial message has not occurred and been sensed by the system within a predetermined first response time (which may be programmed into the system) from when the initial message was delivered to the food preparer. This second instruction may be presented with greater urgency to the food preparer via the monitor and accompanied by an appropriate audible alert. If the food preparer still does not respond in a timely manner to the second instruction within a predetermined second response time (as indicated by the failure of the system to sense the required action), the logic can further be configured to deliver an additional extremely urgent message to the food preparer and/or send a management alert message to another location (e.g., on-site or off-site manager's computer).

If the test in step 960 indicates that the placement sensor has been activated, step 970 is executed in which the cooking timer is initialized. Next, the system starts the cooking process in step 980.

In step 985, a test is performed to determine if the required total cooking time $t_{ook}$ has elapsed, thereby indicating that food product 906 is finished cooking. If the total cooking time $T_{cook}$ has not elapsed, control passes to step 986 which performs a test to determine if the placement sensor has been deactivated. If the sensor has been deactivated, this indicates that the food preparer has prematurely withdrawn the cooking basket 904 from the fryer 900 before the food product 906 has finished cooking. This is a common problem when restaurants are very busy and food preparers are anxious to provide food products to the customers. However, such premature withdrawal can result in inadequately cooked food being served to consumers. In response to finding that the sensor has been deactivated, an audiovisual indicator, which may be either an audio warning or a visual message displayed on a CRT as shown in step 987, may be provided indicating that the cooking is incomplete. This indicator may be provided to alert the food preparer and/or management. Step 988 is then executed in which the system identifies the food preparer making the error, and logs the date, time, and other pertinent monitored details of the event (e.g., food product removed 5 minutes early from fryer). The food preparer responsible for operating the fryer will have previously been identified to the system by data input from either the restaurant management (e.g., shift charts) or the food preparer (e.g., at the start of the shift). It should be noted that the restaurant management can decide precisely what parameters and information it wishes to track, and then program the system to record that information accordingly. In step 989, the system stores the event-related information in a database which can later be recalled and displayed by the supervisor or management to determine the employee involved and appropriate action. Optionally, the system can provide real-time notification of this information to a remote location by using the capabilities of the system to transmit the data by cellular, digital, Internet, or other wireless communication means; conventional telecommunication means via modem access, or over conventional Internet connections. This will particularly advantageous where management oversees the operation of one or more restaurants from a remote location.

Returning to step 985, if the total cooking time $t_{ook}$ has elapsed, an audiovisual indicator, which may be either an audio warning or a visual message displayed on a CRT as shown in step 990, may be provided instructing the food preparer to remove the cooking basket 904 from the fryer 900 because the food product 906 is finished cooking. This may be accompanied by an audible alert initiated by the system. Control is then returned to step 940 to await receipt of another cooking instruction.

It should be recognized that the system is not limited to verification of manual tasks associated with cooking food, but may be used to verify the completion of any equipment-related manual tasks such as maintenance and other procedures e.g., changing or filtering of shortening or oil used in deep vat fryers. To verify that proper shortening or oil maintenance has been performed, the system control logic may be programmed to record various parameters such as the actual time it took for an employee to drain, clean, and refill the fryer with new shortening or oil. The system can then compare this information to preprogrammed baseline time durations normally associated with completing these tasks properly. If the comparison indicates these tasks were completed in less time than the baseline values, the maintenance operations could not have been properly performed. The system may also be programmed to monitor the temperature of the cooking medium (i.e., oil or shortening), for example, by a temperature probe located in the vat which is normally immersed while the fryer is in an operable condition. If the fryer is fully drained (as it should be) during maintenance, the temperature probe should become exposed to air and the system should see temperatures approaching ambient conditions. If the fryer vat has only been partially drained by an employee, the probe will not be exposed to air and higher than ambient temperatures will be sensed by the system, thereby indicating that the maintenance was not properly performed.

It should be recognized that the system is not limited to the use of any particular type of sensors 906 to verify the completion of manual equipment related tasks. Depending on the specific manual task to be verified which is a matter of design choice, the system may be provided with and rely on any suitable sensor whose selection and application will be well known to those skilled in the art (e.g, temperature sensors, flow detectors, etc.). Moreover, it is not necessary that the system be provided with any discrete sensor at all and may in fact measure various equipment operating parameters, for example, such as current (amps) draw, to obtain the information necessary to verify that a manual task has been performed involving the equipment.

Virtual Hold Timer

The system of the present invention may also be used to establish a "virtual timer" to track the hold times for food after it has been cooked. In one embodiment, for example, the system may be used to track hold times for fried chicken that is prepared in a deep vat fryer. This embodiment may be understood by reference to FIG. 9A described above and FIG. 10A which depicts exemplary control logic that may be used to create a virtual timer. This control logic may reside and be implemented in a kitchen base station or the control center, at the system user's discretion.

Figure 10A:
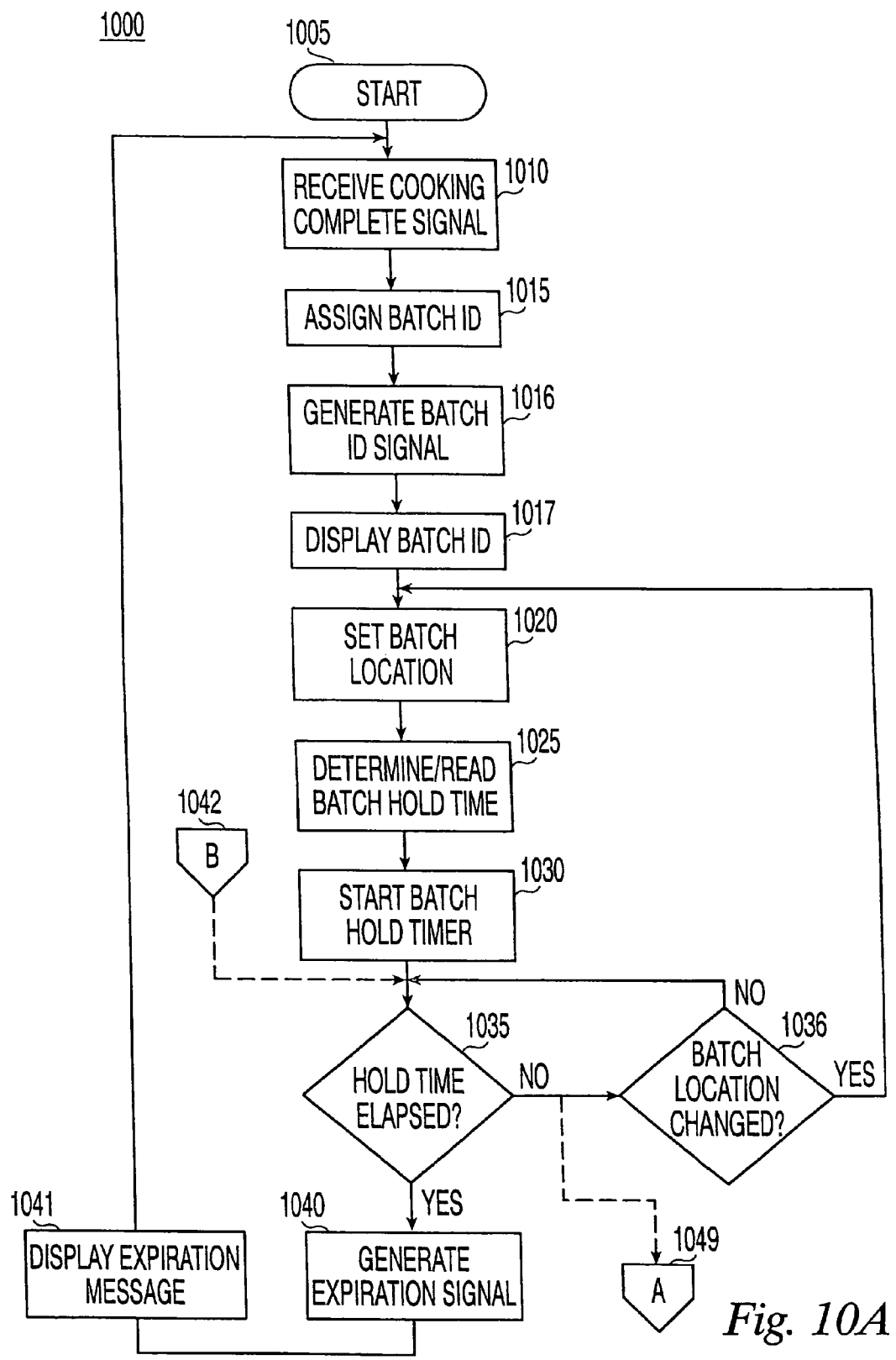
FIG. 10A is a flow chart showing exemplary control logic of the system for a virtual hold timer used to track the movement of batches of food through a commercial kitchen and determining when the food hold time has expired.

Referring now to FIG. 10A, logic process 1000 begin with step 1005. In step 1010, the system receives a signal that a batch of food, for example fried chicken, has finished cooking ("cooking complete" signal). This signal may be triggered in the system by a food preparer manually depressing a button on the fryer controller affirming that the chicken has been removed from the fryer after the cooking cycle is completed. Alternatively, the system may automatically detect the removal of the fryer basket by deactivation of a placement sensor 906 (as shown in FIG. 9B) whose function is described above with reference to another embodiment of the invention shown in FIG. 9C.

Once the Cooking Complete signal is received, the system automatically assigns a Batch Identification Number (BID) to that batch of food, which has been prepared in one of the fryers 901 (reference FIG. 9A) in step 1015. The BID will be used to track the batch of food in its movement through the restaurant's various holding areas 902 and 915 (FIG. 9A) until it is either sold and delivered to the consumer or discarded (if the batch hold time has expired). The system generates a signal in step 1016 representing the BID and displays the BID in step 1017 on a local CRT display located near the fryers 901. The employee will use the assigned BID for entry into the system upon subsequently moving the food product throughout the restaurant. Of course, the BID may optionally be manually assigned by the employee.

The restaurant employee next places the batch of cooked food in one of the food holding areas 902 or 915 (FIG. 9A). Upon placing the food in a food holding area, the employee reads the BID (e.g., FCHK3 representing the third batch of fried chicken prepared on a given day) off of the CRT display associated with the cooking/preparation appliance and enters this information into the system via an alphanumeric keypad 916 (FIG. 9A) that may be provided with the holding areas 902 or 915. Preferably, the keypad 916 is capable of wireless communications with the system and need not be physically a part of the food holding areas 902 or 915. Alternatively, the employee may enter the BID into the system via any available data entry means which may be provided with the system such as an alphanumeric keyboard, voice recognition system, hand-held wireless data entry devices that are in communication with the system (e.g., similar to those used for inventory control or completing mobile POS purchase transactions), or any other suitable device. The type of data entry means used is a matter of design choice.

The holding area keypad 916 may be linked to and communicate with the system by either a wireless or conventional hard-wired data communication link. The use of wireless communication links between a keypad and a main system are well known not only in the food preparation industry, but also in the wireless premise intrusion alarm system art. Such keypad devices may operate off standard 120 volt AC hard wired power supplies or off of battery power. It should be recognized that the employee may select the holding area in which to place the food, or alternatively, the control logic of the system may be programmed to automatically select a holding area and then deliver an instruction to the employee to place the food in the area selected by the system, displaying the BID on the CRT associated with the holding area where its supposed to be placed. In this instance, a variation of the logic of FIG. 9C can be used to verify that the appropriate batch of food has been put there. It will be apparent that the cooked food may be placed in any available (unoccupied) holding area 902 or 915. Each holding area is assigned it own unique designation code (e.g, $FHB_1$, $FHPOS_3$, etc.) by the restaurant management as illustrated in FIG. 9A. These holding area designation codes are pre-programmed into, and are recognized by, the system. The keypad 916 may be provided with a visual display or readout which identifies the BID of the food product which has been placed in that respective food holding area. Alternatively, this information may be shown on a system CRT display that may show several food holding area designation codes and the BID of food products that reside therein.

With continuing reference to FIG. 10A, in step 1020, the control logic next creates a link and associates the holding area designation code with the BID by virtue of the employee entering the BID into the system via the holding area keypad (or the system assigning the hold area to be used and instructing the employee to place the cooked food there) as described immediately above. For example, the employee may place fried chicken BID FCHK3 in holding area $FHB_1$, and enters the BID into the keypad at holding area $FHB_1$ It should be recognized that the keypad may be an integral part of and physically attached to the holding area device during its manufacture, or the keypad may be a separate, stand alone unit that is added later to the holding area setup.

In logic step 1025, the system next determines the proper hold time at a particular holding temperature for the type of food product that has been prepared (here, for example, fried chicken). To make this determination, the control logic accesses a database into which hold times as a function of holding temperature have been entered by restaurant management for all the various types of food products that a given restaurant might prepare. This database may reside within the local base stations or at the control center. For example, the control logic may read a database entry that indicates the maximum hold time for fried chicken held at a temperature of 110 degrees Fahrenheit is 60 minutes. It should be recognized that hold times may be stored in tabular form in the database with discrete entries of temperature and hold times. Alternatively, hold time information may be stored in the system database as a set of curves in the form of hold times versus temperature. The stored hold time information may include an "offset" such that any warning generated in connection with the expiration of the hold time will sufficiently precede the actual hold time expiration to allow appropriate steps to be taken (i.e., an "advance notification" time). This aspect of the invention will be further described below in conjunction with FIG. 10B.

Once the proper hold time has been determined in step 1025, the control logic next starts a hold timer in step 1030 which begins counting down the remaining hold time for the particular batch of food in question. This "virtual" hold timer will continue to monitor the elapsed time for the food product with its associated BID as the food is physically moved through the restaurant by the employees as described below.

In logic step 1035, a test is performed to determine if the hold time has elapsed for the batch of food being tracked. If the hold time has not elapsed, step, 036 executes a test to determine if the food product batch has changed holding area locations. For example, if batch of fried chicken BID FCHK3 is moved from its initial back kitchen holding area ($FHB_1$) to point of sale holding area $FHPOS_2$, the employee enters BID FCHK3 into the holding area keypad associated with $FHPOS_2$. The system would therefore receive information that BID FCHK3 is now in holding area $FHPOS_2$ instead of $FHB_1$. Thus, using this example, the control logic performing the test in step 1036 would return a positive answer that the hold area location has changed for BID FCHK3. In this case, control is returned to step 1020 which records in the system the new, changed holding area location associated with batch of fried chicken BID FCHK3. Since hold times may differ according to such factors as the holding temperature, for example, the remaining hold time for the new location is recalculated in step 1025 factoring into the calculation any time already expended in the previous holding area location. The logic process then continues with steps 1030 and 1035 as described above.

If in step 1036 a negative response is initially returned to the test indicating that the food holding area location has not been changed, control is returned to step 1035.

If in step 1035, however, the hold time is found to have elapsed, step 1040 is executed, generating a signal indicating that the hold time has expired for the batch of food (BID FCHK3 using the above example). Responsive to the signal generated in step 1040, an audiovisual indicator, which may be either an audio warning or a visual message displayed on a CRT as shown in step 1041, may be provided indicating that the hold time has expired and that the batch of food should be discarded. Control is then returned to step 1010 ready to begin the logic process again.

Figure 10B:
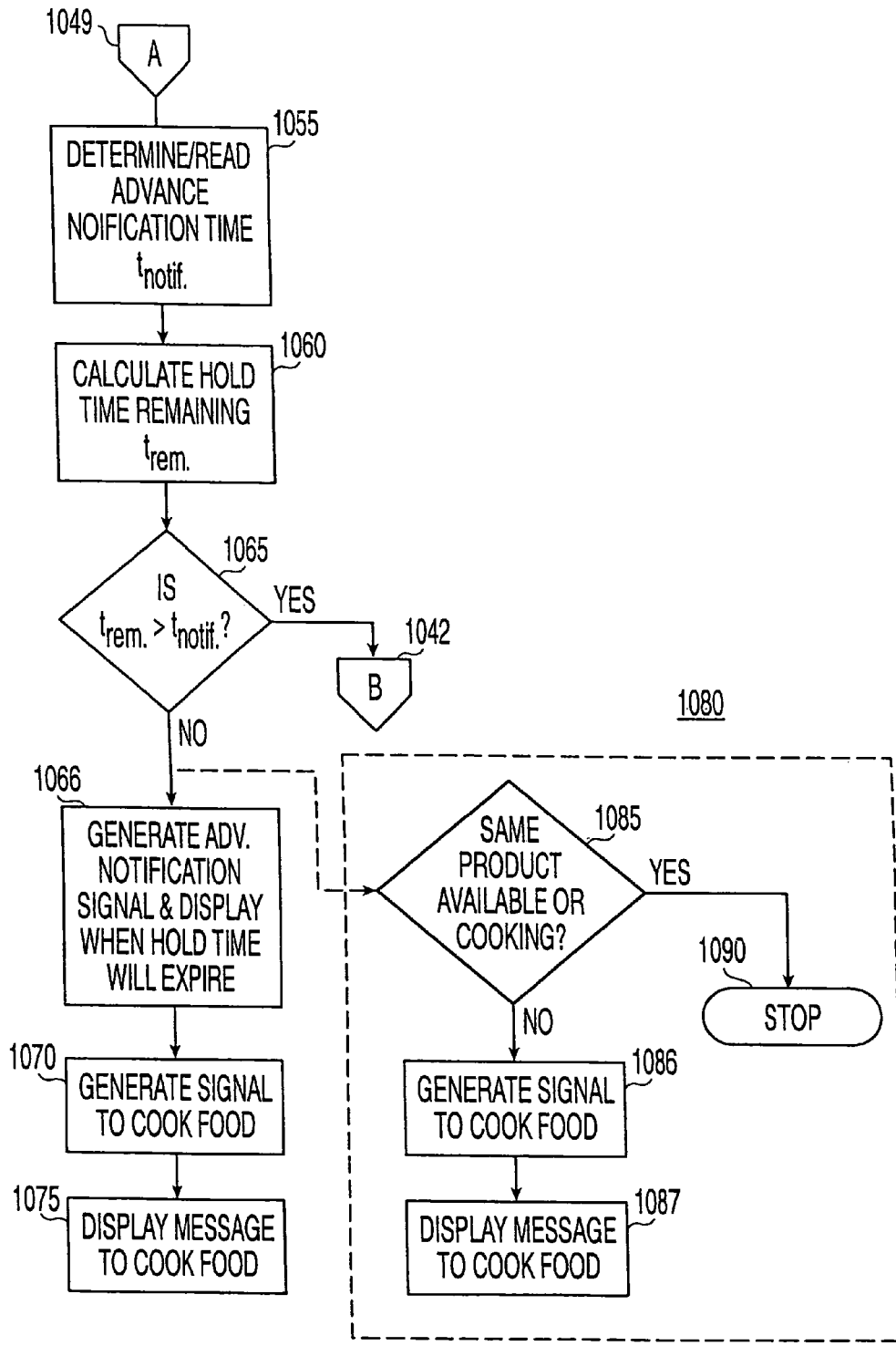
FIG. 10B is a flow chart showing exemplary control logic of the system for assisting commercial kitchen management with inventory control of cooked food products.

FIG. 10B depicts an additional embodiment logic process 1050 (which is a variation of logic process 1000) that is directed to assisting a restaurant in controlling inventory of its cooked food products. The system can perform this function by sensing that the hold time for a batch of food will soon expire, and then sending advance instructions to cook more of that particular food. This allows restaurant management and employees enough advance warning to prepare additional batches of food which will be ready in time to replace the soon-to-expire batch of food, thereby ensuring that consumers' demand for that particular food item can be met without undue delay and consumer dissatisfaction.

Referring to FIG. 10B, after the test in step 1035 is performed (FIG. 10A) and a negative response is returned, control passes in step 1049 to step 1055 which is performed in parallel with step 1036 (FIG. 10A). In step 1055, the system selects the proper advance notification time $t_{notif.}$ that has been previously input into a database accessible to and residing in the system by the restaurant management. This database may reside in the base stations or the control center. Time $t_{notif.}$ generally represents the amount of lead time required to both prepare and cook a replacement batch of any particular food product, and may be empirically determined. For example, the advance notification time $t_{notif.}$ to prepare and cook fried chicken may be twenty minutes.

In step 1060, the remaining hold time $t_{rem.}$ is calculated by reference to the batch hold timer which is initiated in step 1030 (FIG. 10A). In step 1065, a test is performed to determine if an advance notification message should be delivered to start preparation of another batch of food to replace the food whose hold time will soon expire. This is accomplished by comparing the advance notification time $t_{notif.}$ with the remaining hold time $t_{rem.}$. If in step 1065 $t_{rem.}$ is greater than $t_{notif.}$, step 1042 is executed which transfers control back to step 1035 in logic process 1000 (FIG. 10A). If in step 1065 $t_{rem.}$ is equal to or less than $t_{notif}$, step 1070 is executed which generates a signal instructing employees to cook more food. Responsive to the signal generated in step 1070, an audiovisual indicator, which may be either an audio warning or a visual message displayed on a CRT as shown in step 1075, may be provided instructing employees that another batch of food should be prepared and cooked to replace the food whose hold time is about to expire. Optionally, as shown in step 1066, the system and control logic may be configured such that an advance notification message signal is also generated and accompanied by an audiovisual indicator advising employees of the time when the food hold time will expire. A visual message may be displayed showing the number of minutes in the future when the hold time expires (e.g., 20 minutes), the real time of day (e.g., 2 p.m.), or both.

It will be appreciated by one skilled in the art that with the networking capability of the invention, logic process 1050 could be modified and customized in a number of different ways to assist a restaurant in managing and controlling its inventory of cooked food products. For example, optional logic process 1080 in FIG. 1013 is a variation of logic process 1050 which is directed to checking available cooked food product inventories in a restaurant before instructing employees to cook additional batches of food. Logic process 1080 begins with the results of the test performed in step 1065 of logic process 1050. Based on obtaining a negative result for the test in step 1065, step 1085 is executed which is a test to determine if a replacement batch of food product (for the batch whose hold time will soon expire) is already available either in the process of being cooked or in another hold area. Since the system is capable of communicating with cooking appliances connected to communication network of the system, the system can readily determine what food products are in the process of being cooked and their expected cooking completion times. If in step 1085 the system finds another batch of the food product available, control passes to step 190 which stops logic process 1080. This prevents the possibility that a replacement batch of food will be unnecessarily cooked resulting in an inventory of that particular food product in excess of consumer demand. This undesirable situation would mean that the excess food would eventually be discarded after its hold time expires and increase operating costs for the restaurant. If in the test of step 1085 a replacement batch of cooked food product is not found in the restaurant, steps 1086 and 1087 are executed which are identical to steps 1070 and 1075, respectively, which generates a signal and audiovisual indicator advising employees and/or management that an additional batch of food should be cooked.

Shortening Management/Fryer Maintenance Management

Figure 11:
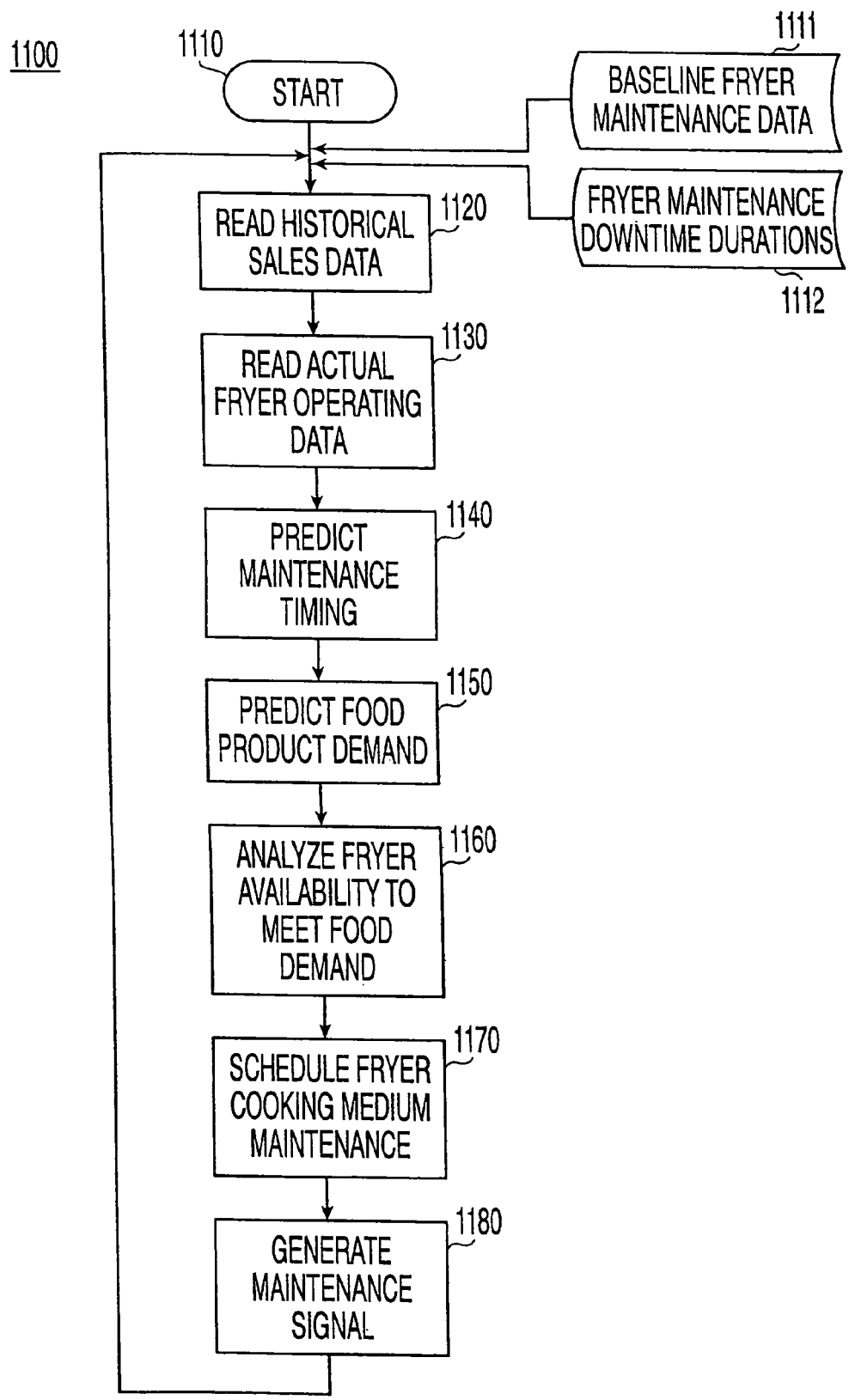
FIG. 11 is a flow chart showing exemplary control logic of the system for providing networked cooking medium maintenance for a plurality of flyers.

The system of the present invention may also be used to provide networked and integrated management, including maintenance (e.g., changing and filtering of oil or shortening), of a plurality of fryers at a given restaurant location. In one embodiment of the invention, the system may be used to balance multiple fryer usage and to schedule the maintenance of the various fryers to ensure that a maximum number of fryers are available for service during peak demand periods for food. Exemplary control logic which may be programmed into in the system of the invention to balance fryer utilization and maintenance is shown in the flowchart of FIG. 11. This control logic may reside and be implemented in a kitchen base station or the control center, at the system user's discretion.

Referring to FIG. 11, logic process 1100 begins with step 1110. In step 1111, the control logic is pre-programmed with baseline fryer maintenance data that is used to determine the maximum number of fryer cooking cycles desirable for each fryer before changing or filtering of the cooking medium is required. This baseline data may include, but is not limited to: the type of food products cooked, time durations for both active cooking and idle time, cooking temperatures, types of cooking medium that may be used (e.g., shortening, vegetable oil, canola oil, etc.), and other parameters which are at the restaurant management's discretion to be used for determining when fryer cooking medium maintenance is required. The baseline data may be readily determined by empirical methods and from experience in the restaurant industry. In step 1112, the control logic is also preprogrammed with the time durations necessary to complete a maintenance cycle such as changing or filtering the cooking medium (i.e., maintenance downtime). This data will be dependent on the specific brand or type of fryers used and their design characteristics (e.g., volumetric capacity of the fryer vat, cooking medium pump flowrate, etc.).

It should be noted that the baseline data discussed above in steps 1111 and 1112 may be preferably stored in a database accessible to the system and may reside either in the local kitchen base stations or the remotely located control center.

Continuing with the logic process in step 1120, the system next reads historical sales data maintained by the system to determine the demand for various types of food products (i.e., fried chicken, french fries, fried fish, onion rings, etc.) served at a specific restaurant location for a given day of the week and time of day. This data may be stored and updated in a database residing in the system either in a local kitchen base station or at a remotely located control center. This information is preferably collected by the POS (point of sale) system for a specific restaurant since demand for various types of food will differ by the geographic location of the restaurant and preferences of the consumers it serves.

In step 1130, the system monitors and determines the actual usage of individual fryers at a particular restaurant location or cell as shown in FIG. 1. in this step, relevant data on actual operating conditions is collected and read by the system for each fryer. This data will be used by the system to determine when the cooking medium for each fryer will require maintenance and the type of maintenance operation required (i.e., cooking medium changing or filtering). This may include, but is not limited to, the number of cooking cycles actually completed since the last cooking medium filtration or changing, elapsed time of fryer usage, fryer idle time and temperature of cooking medium while idle, cooking cycle temperatures, type of food cooked, and other data which will be used by the system to determine when the cooking medium requires changing or filtering. The actual usage information on each fryer may be tracked and stored by each individual appliance microprocessor controller, a local kitchen base station, a remotely located control center, or any combination of the foregoing. It should also be noted that if a fryer is broken and unavailable for service, the system would identify the fryer's unavailability during step 1130 as well. Therefore, the broken fryer or fryers would not be factored into the subsequent logic step determinations described below.

In step 1140, the predicted time when each fryer will require maintenance and the expected duration of the maintenance is determined for each fryer at a given restaurant location by using the baseline data pre-programmed into the system in steps 1111 and 1112, and the actual operating data obtained by the system for each fryer in step 1130.

Step 1150 continues the control logic with the system utilizing the historical sales data read in step 1120 to forecast or predict the expected demand for each type of food product served at a specific restaurant location at any given time of day for any given day of the week. The system thus generates demand profiles for each type of food product consisting of the quantity sold versus the time of day for a given day of the week. For example, therefore, the system may know that consumer demand for fried fish may peak at noon on Fridays, while the demand for fried chicken is maximum at six o'clock in the evening on the same day. The demand profiles generated by the system are preferably updated on a continuing basis using the historical sales data from the POS system, to ensure the most accurate food product demand forecasts can be made. It should be recognized that there will typically be more than one period during any given day when food product demand in general will peak for any given product, typically there are two peaks (lunchtime and dinnertime). Optionally, the system may also read in historical food product demand data from past years to reflect seasonal changes in food product ordering habits of consumers where it is known by restaurant management that such seasonal variations exist. Thus, it is apparent the system is extremely flexible and the type of data used by the system in generating food product demand profiles is controlled by and at the discretion of restaurant management.

Proceeding to logic step 1160, the predicted maintenance timing (time of day), duration, and type of operation required (i.e., filtering or changing of the cooking medium) for each fryer as calculated by the system in step 1130 is compared with the demand forecast for each type of food product served at the restaurant on a given day of the week as determined in step 1150. This allows the system to determine if a sufficient number of fryers will be available to meet the upcoming peak demands for the various types of food products being served.

Still referring to FIG. 11, the logic process is continued in step 1170 wherein the system schedules the timing of all fryer maintenance operations at the specific restaurant location based on their maintenance requirements determined in the preceding logic steps. Preferably, the maintenance cycles are planned to ensure that a sufficient number of fryers are available for service to meet peak demand periods for the various type of food products being served. Accordingly, the maintenance operations are preferably scheduled to coincide with off-peak periods of food product demand to the extent possible. When it is time to run a maintenance procedure on a specific fryer, the system next generates and delivers a signal in step 1180 containing that information. In restaurants which have fully automated fryer maintenance operations, the signal generated is a control signal which automatically initiates the required maintenance operation. Where fryer maintenance operations are initiated manually by restaurant employees, the signal generated is an information signal which provides notification via a message display to the employees to initiate a maintenance cycle. This informational signal would identify the specific fryer and type of maintenance operation required (e.g., "change cooking medium" or "filter cooking medium"). The information can be displayed on a local CRT display and may be optionally accompanied by an audible alert which is also generated by the system to coincide with the delivery of the informational maintenance message. Following step 1180, control is returned to step 1120 which continues logic process 1100.

It will be recognized by those skilled in the art that the control logic depicted in FIG. II can be modified in any number of ways to suit the individual needs and preferences of various restaurant establishments. For example, the control logic may include steps to balance fryer utilization by allocating and scheduling the cooking cycles among various fryers at a specific restaurant location. The system would thus instruct the employees as to which fryers to use for which food products at any given period during the day. These instructions may be displayed on local CRT displays associated with the fryers. Balancing fryer utilization would help to further ensure that a maximum number of fryers are available to meet peak demand periods for food.

With respect to the foregoing embodiments of the invention which have been described, it should be recognized that communications, whether between the individual appliances, base stations, control center, or any combination thereof, may be accomplished by any suitable wireless or wired means for the intended application and is a matter of design choice. Preferably, communications are effectuated through wireless communication platforms whose technology is well established and known to those skilled in the art. More preferably, the wireless communications are performed over the Internet using established nationwide wireless networks. However, the Internet links may also be conventional, wire-based connections such as through standard telecommunication lines, DSP lines, T1 service, etc.

It will also be appreciated by those skilled in the art that individual appliances and base station local networks may be communicated with via any of the numerous mobile communication devices prevalent in today's electronic technology. These devices may include, but are not limited to, cellular and other wireless communicating devices which may be embodied in a phone-type platform, laptop or notebook computers, personal digital assistants (PDAs) or Pocket PCs, etc. Accordingly, for example, these devices may be used to upload or download data, control appliance and base station operations including food preparation and maintenance, monitor appliance status and sales, etc., all from a remote location. These communication devices may effectuate contact with the appliances or base stations via wireless Internet connections using established nationwide wireless networks.

It should be noted that no system is perfect, and employees may always manage to find ways to cheat. Moreover, there is always some degree of human involvement in any automated process at some point, especially in operating a food service establishment. Accordingly, there is no system that can, with 100 percent certainty, "verify" full compliance is being actually achieved at all times. The present invention, however, surpasses systems of the past because it is based more heavily on empirical data and actual measurement of objective parameters to verify that tasks are properly being completed.

It should further be recognized that the invention is not limited to the particular embodiments described above. Accordingly, numerous modifications can be made without departing from the spirit of the invention and scope of the claims appended hereto. For example, it will also be appreciated by those skilled in the art that the invention is not limited to restaurant applications, but may be employed in any commercial, institutional, or residential application wherein appliances are used. Moreover, the invention is not limited to use with any particular type of food product or appliance, and will find broad applicability in the food preparation and service industry wherever the invention may be feasibly employed. Thus, the invention may be used with ovens, ice machines, dishwashers, refrigerators, heating and air conditioning units, etc. which may be provided with microprocessor-based controllers to provide a communication interface with the system and network of the invention. Accordingly, these appliances may be "Web-enabled" to effectuate communications with the system via the Internet.

What is claimed is:

1. A communication system for monitoring the operation and maintenance of at least one kitchen appliance, comprising:
    a control center;
    a database, operatively coupled to the control center, containing data related to said at least one kitchen appliance; and
    a communication network interconnecting said at least one kitchen appliance with said control center,
    wherein said system, responsive to data regarding the operation and maintenance of said at least one kitchen appliance, generates a message which results in a service activity for said appliance, and upon the completion of such service activity, generates a second at least one of an accounting or billing system which causes the transfer of funds associated with the service of a specific one of said at least one kitchen appliance, from a users financial institution to an agency's financial account performing the service.

2. The communication system of claim 1, further comprising a repair vehicle, said repair vehicle in communication with said control center, said control center dispatching said repair vehicle in response to said data regarding maintenance of said at least one kitchen appliance.

3. The communication system of claim 2, wherein a repair is effected as a result of dispatching said repair vehicle and said billing data is a bill for said repair.

4. The communication system of claim 1, wherein data regarding the operation and maintenance of at least one kitchen appliance is the monitoring of the degradation of said at least one kitchen appliance.

5. The communication system of claim 4, wherein said control center causes a message to be displayed at said at least one kitchen appliance if said degradation exceeds a predetermined level.

6. The communication system of claim 4, wherein said control center disables said at least one kitchen appliance when said degradation exceeds a predetermined level.

7. The communication system of claim 4, wherein said control center communicates with said at least one kitchen appliance to change an operational parameter of said kitchen appliance to compensate for said degradation.

8. The communication system of claim 1, further comprising a handheld terminal, communicating with said control center and said kitchen appliance.

9. The communication system of claim 8, wherein said control center prepares and transmits an invoice to said handheld terminal upon completion of maintenance for said at least one kitchen appliance.

10. The system of claim 1, wherein said communication network is a wireless network.

11. The communication system of claim 1, wherein said data includes a serial number associated with said kitchen appliance.

12. A communication system for monitoring the operation and maintenance of at least one kitchen appliance, comprising:
    a control center;
    a database, operatively in communication with said control center, containing at least one of accounting and billing data for said at least one kitchen appliance; and
    a communication network interconnecting said at least one kitchen appliance with said control center,
    wherein said system, responsive to data regarding the operation and maintenance of said at least one kitchen appliance, prepares at least one of accounting and billing reports for said at least one kitchen appliance, said communication system charging a user's financial account for expenses associated with service of said at least one kitchen appliance.

13. The communication system of claim 12, further comprising a repair vehicle, said repair vehicle in communication with said control center, said control center dispatching said repair vehicle in response to said data regarding maintenance of said at least one kitchen appliance.

14. The communication system of claim 12, wherein a repair is effected as a result of dispatching said repair vehicle and said billing data is a bill for said repair.

15. The communication system of claim 12, wherein data regarding the operation and maintenance of at least one kitchen appliance is the monitoring of the degradation of said at least one kitchen appliance.

16. The communication system of claim 15, wherein said control center causes a message to be displayed at said at least one kitchen appliance if said degradation exceeds a predetermined level.

17. The communication system of claim 15, wherein said control center disables said at least one kitchen appliance when said degradation exceeds a predetermined level.

18. The communication system of claim 15, wherein said control center communicates with said at least one kitchen appliance to change an operational parameter of said kitchen appliance to compensate for said degradation.

19. The communication system of claim 12, wherein said communication network is a wireless network.

20. The communication system of claim 12, further comprising a handheld terminal, communicating with said control center and said kitchen appliance.

21. The communication system of claim 20, wherein said control center prepares and transmits an invoice to said handheld terminal upon completion of maintenance for said at least one kitchen appliance.

22. The communication system of claim 12, wherein said data includes a serial number associated with said kitchen appliance.

23. A method of processing at least one of billing, accounting and diagnostic information for kitchen appliances wherein a plurality of kitchen appliances each transmits and receives data associated with their operating conditions across a communication system to a control center, comprising the steps of:
   initiating service of a specific kitchen appliance upon the occurrence of a predetermined condition;
   retrieving from said control center information associated with said specific kitchen appliance so as to thereby generate a repair invoice;
   retrieving billing information from said control center for said specific kitchen appliance; and
   transmitting said billing information to said communication system, said communication system electronically transferring funds for the repair of said specific kitchen appliance from a user's financial account to an agency's financial account performing the repair.

24. The method of claim 23, further comprising the steps of providing a repair vehicle in communication with said control center, said control center dispatching said repair vehicle in response to said data regarding maintenance of said at least one kitchen appliance.

25. The method of claim 23, further comprising the step of effecting a repair as a result of dispatching said repair vehicle and said billing data is a bill for said repair.

26. The method of claim 23, further comprising the steps of monitoring the degradation of said at least one kitchen appliance.

27. The method of claim 26, wherein said control center causes a message to be displayed at said at least one kitchen appliance if said degradation exceeds a predetermined level.

28. The method of claim 26, wherein said control center disables said at least one kitchen appliance when said degradation exceeds a predetermined level.

29. The method of claim 26, wherein said control center communicates with said at least one kitchen appliance to change an operational parameter of said kitchen appliance to compensate for said degradation.

30. The method of claim 29, further comprising the step of said control center sending software to said handheld terminal to effect one of maintenance and repair to said kitchen appliance.

31. The method of claim 29, further comprising the step of storing at least one of payment history, maintenance history, appliance part inventory, customer data, repair history, malfunction history, and warranty records for said at least one kitchen appliance in said database.

32. The method of claim 23, wherein said communication network is a wireless network.

33. The method of claim 23, further comprising the step of communicating with said control center and said kitchen appliance from a handheld terminal.

34. The method of claim 23, further comprising the step of updating at least one of the accounting, billing and maintenance in response to said service performed.

\* \* \* \* \*